US009458264B2

(12) United States Patent
Aoshima et al.

(10) Patent No.: US 9,458,264 B2
(45) Date of Patent: Oct. 4, 2016

(54) BARRIER LAMINATE AND NOVEL POLYMER COMPOUND

(71) Applicant: FUJIFILM Corporation, Tokyo (JP)

(72) Inventors: Toshihide Aoshima, Kanagawa (JP); Tomoaki Yoshioka, Kanagawa (JP); Shinya Suzuki, Kanagawa (JP); Hiroshi Kawakami, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 350 days.

(21) Appl. No.: 14/188,055

(22) Filed: Feb. 24, 2014

(65) Prior Publication Data

US 2014/0170345 A1 Jun. 19, 2014

Related U.S. Application Data

(63) Continuation of application No. PCT/JP2012/074565, filed on Sep. 25, 2012.

(30) Foreign Application Priority Data

Sep. 26, 2011 (JP) ................................ 2011-209077
Sep. 30, 2011 (JP) ................................ 2011-216640

(51) Int. Cl.
*B32B 13/12* (2006.01)
*C08F 20/68* (2006.01)
*C08J 7/04* (2006.01)

(52) U.S. Cl.
CPC ................ *C08F 20/68* (2013.01); *C08J 7/045* (2013.01); *C08J 2367/02* (2013.01); *C08J 2463/10* (2013.01); *Y10T 428/1341* (2015.01)

(58) Field of Classification Search
CPC .... C08J 7/45; C08J 2367/02; C08J 2463/10; C08F 20/68; Y10T 428/1341
USPC .................................................... 428/35, 451
See application file for complete search history.

(56) References Cited

U.S. PATENT DOCUMENTS 6,413,645 B1 7/2002 Graff et al.
8,241,754 B2 8/2012 Aiba
(Continued)

FOREIGN PATENT DOCUMENTS

EP 2228846 A1 9/2010
JP 11-142603 A 5/1999
(Continued)

OTHER PUBLICATIONS

STIC Search Report dated Mar. 22, 2016.*
(Continued)

*Primary Examiner* — Eisa Elhilo
(74) *Attorney, Agent, or Firm* — Jean C. Edwards, Esq.; Edwards Neils LLC

(57) ABSTRACT

The present invention provides a barrier laminate with enhanced heat resistance performance, comprising at least one organic layer and at least one inorganic barrier layer, the organic layer being formed by curing a polymerizable composition comprising a polymerizable compound having two or more polymerizable groups, and the total quantity of uncured component in the organic layer being 1.5 weight % or less of the total weight of the organic layer, and a novel polymerizable compound that can preferably used as the polymerizable compound, which is denoted by general formula (11):

general formula (11)

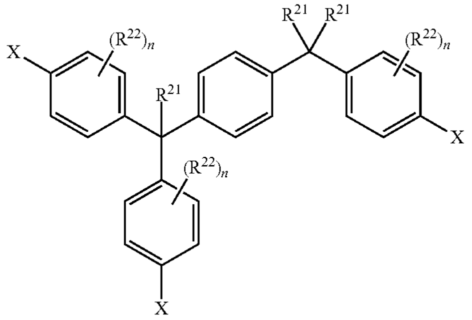

in general formula (11), $R^{21}$ denotes hydrogen atom or methyl group; $R^{22}$ denotes methyl group or cyclohexyl group; n denotes an integer of 0 to 2; and each instance of X denotes a group comprising a polymerizable group.

20 Claims, 1 Drawing Sheet

(56) References Cited

U.S. PATENT DOCUMENTS

| | | | | |
|---|---|---|---|---|
| 8,329,306 | B2 | 12/2012 | Oouchi et al. | |
| 8,404,353 | B2 | 3/2013 | Aiba | |
| 2009/0169906 | A1 | 7/2009 | Aiba | |
| 2010/0227178 | A1* | 9/2010 | Oouchi | C08J 7/045 428/451 |
| 2012/0276285 | A1 | 11/2012 | Aiba | |

FOREIGN PATENT DOCUMENTS

| | | | | |
|---|---|---|---|---|
| JP | 2002-264274 | A | 9/2002 | |
| JP | 2009-113455 | A | 5/2009 | |
| JP | 2009-154473 | A | 7/2009 | |
| JP | 2010-160300 | | 7/2010 | |
| JP | 2010160300 | * | 7/2010 | G03F 7/027 |
| JP | 2010-228446 | A | 10/2010 | |
| JP | 2012-096409 | A | 5/2012 | |
| JP | 2012-246422 | | 12/2012 | |

OTHER PUBLICATIONS

English translation (Apr. 1, 2016) of the Japanese Patent No. JP 2010160300.*

Japanese Official Action issued by JPO on Sep. 24, 2014 in connection with corresponding Japanese Patent Application No. 2011-216640.

Office Action issued by the Japanese Patent Office on Nov. 18, 2014 in connection with Japanese Patent Application No. 2011-209077.

Jingwei He et al., Synthesis and Characterization of a New Trimethacrylate Monomer with Low Polymerization Shrinkage and Its Application in Dental Restoration Materials, Journal of Biomaterials Application, Sep. 2010, vol. 25, No. 3, pp. 235-249.

International Search Report issued in PCT/JP2012/074565 on Dec. 25, 2012.

Written Opinion issued in PCT/JP2012/074565 on Dec. 25, 2012.

First Office Action issued by the State Intellectual Property Office (SIPO) of China on Mar. 17, 2015 in connection with Chinese Patent Application No. 201280046728.7.

International Preliminary Report on Patentability issued on Apr. 10, 2014, in connection with priority application No. PCT/JP2012/074565.

* cited by examiner

BARRIER LAMINATE AND NOVEL POLYMER COMPOUND

CROSS-REFERENCE TO RELATED APPLICATIONS

This application is a continuation of PCT/JP2012/074565, filed Sep. 25, 2012, which was published under PCT article 21(2)in Japanese, and which in turn claims priority to Japanese Patent Application No.2011-209077 filed on Sep. 26, 2011 and Japanese Patent Application No. 2011-216640 filed on Sep. 30, 2011, the entire contents of all of which are incorporated herein by reference.

TECHNICAL FIELD

The present invention relates to a barrier laminate, a gas barrier film, and a device employing the same. More particularly, the present invention relates to a barrier laminate and a gas barrier film suited to solar cell elements, organic EL elements, optical elements, and sealing bags. The present invention further relates to a novel polymerizable compound suited to polymerizable compositions for forming the organic layer in the above barrier laminate, to a polymerizable composition containing the polymerizable compound, and to the cured product thereof.

BACKGROUND ART

Conventionally, gas barrier films in which a metal oxide thin film of aluminum oxide, magnesium oxide, silicon oxide, silicon nitride, silicon oxynitride, or the like is formed on the surface of a plastic film have been widely employed in the packaging of products requiring the blocking of various gases such as water vapor and oxygen, and in packaging applications to prevent the deterioration of foods, industrial products, pharmaceuticals, and the like.

In recent years, the use of plastic film substrates instead of glass substrates, which are heavy and tend to crack, has begun. Plastic film substrates are suited to roll to roll methods, making them advantageous in terms of cost. However, plastic film substrates present a problem in the form of water vapor barrier properties that are inferior to those of glass substrates. Thus, when plastic film substrates are employed in liquid crystal display elements, water vapor penetrates into the liquid crystal cells, causing display defects.

For use in actual display elements, the formation of a layer having antireflective properties is indispensable to increasing visibility. Conventionally, a laminate film of a high refractive index layer and a low refractive index layer has been proposed as an antireflective film for display elements. These laminate films are usually formed by the sputtering method or the reactive sputtering method (for example, Patent Reference 1). Additionally, display elements and liquid crystal display elements deteriorate rapidly in the presence of oxygen and water vapor. Thus, display elements need to be protected with a layer having gas barrier properties. Accordingly, there is a strong need for the development of a film possessing both gas barrier properties and antireflective performance. The use of a gas barrier film in which a laminate of the organic/inorganic lamination type is formed on a plastic film is known to solve this problem. Patent Reference 2 discloses a gas barrier film in which an organic layer of a cured composition containing a hexafunctional acrylate or methacrylate monomer or oligomer, and an inorganic layer comprised of an oxide selected from among aluminum oxide, silicon oxide, and a complex oxide of indium and tin are laminated. Although Patent Reference 2 states that the barrier property increases with the quantity of hexagonal acrylate monomer or the like in the composition to be cured in a range of 30 weight % and above, a content of 100 weight % only keeps the water vapor permeability to 0.08 $g/m^2/day$. Additionally, further better barrier properties are demanded of substrates used in organic EL elements. The water vapor permeability is preferably less than 0.005 $g/m^2/day$, which is the detection threshold by the MOCON method.

To solve this problem, Patent Reference 3 discloses the technique of achieving a water vapor permeability of less than 0.005 $g/m^2/day$ by employing a barrier layer in the form of an alternating laminate of multiple layers of organic layers and inorganic barrier layers. According to the Description, the water vapor permeability is 0.011 $g/m^2/day$, confirming the technical value of multilayer laminates.

PRIOR ART REFERENCES

Patent Reference 1: Japanese Unexamined Patent Publication (KOKAI) Heisei 11-142603

Patent Reference 2: Japanese Unexamined Patent Publication (KOKAI) No. 2002-264274

Patent Reference 3: U.S. Pat. No. 6,413,645

SUMMARY OF THE INVENTION

Problem to be Solved by the Invention

However, when taking into account industrial utility, multilayer lamination of organic layers and inorganic barrier layers such as is described in Patent Reference 3 compromises productivity, which is highly problematic when supplying large quantities of gas barrier film. Manufacturing gas barrier films in large quantities and at low cost requires achieving a high barrier property with as few laminates as possible. Given this background, the development of laminates, particularly barrier laminates, of the organic inorganic lamination type that are capable of achieving a water vapor permeability of 0.005 $g/m^2/day$ or less, particularly less than 0.001 $g/m^2/day$, with a single set of an organic layer and an inorganic barrier layer; gas barrier films comprising such barrier laminates; and organic EL elements employing these gas barrier films is desired. Gas barrier films that can be employed as substrates in devices such as organic EL elements need to have good resistance to processing temperatures. Thus, the amount of gas that is generated from the organic layer at elevated temperatures and causes defects needs to be kept low.

Here, the method of curing a polymerizable composition containing a polymerizable compound is generally employed in the organic layer. However, investigation by the present inventors has revealed that when a conventionally known polymerizable compound is cured, the uncured components volatize at elevated temperature. An examination of the cause behind this has revealed it to be the presence of trace quantities of non-polymerizable components (catalysts, by-products) in conventionally known polymerizable compounds. FIG. 1 shows how this happens. The numeral 1 denotes an inorganic barrier layer, 2' denotes an organic layer formed from a polymerizable composition, and 3 denotes an inorganic barrier layer further provided in the surface of the organic layer. Non-polymerizable components (catalysts, by-products) that were contained in the polymerizable compound remain in conventional organic layer 2'.

When heating or degassing is conducted in this state, gases are released that end up compromising the gas barrier property. Further, as shown in FIG. 1, in a structure in which an organic layer 2' is sandwiched between inorganic barrier layers, gases deriving from non-polymerizable compounds (catalysts, by-products) 4 sometimes end up damaging adjacent inorganic barrier layers 3. These phenomena produce marked impacts in devices incorporating barrier laminates in the course of exposure to high temperature processes.

The present invention, devised to solve the above-stated problems, has for its object to provide a gas barrier laminate having good barrier properties that is capable of resisting higher temperatures.

Means of Solving the Problems

Based on the problems set forth above, the present inventors conducted extensive research. This resulted in the discovery that by keeping uncured components in the organic layer to 1.5 weight % or less, it was possible to maintain high barrier properties without damage at elevated temperatures, thereby solving the above problems.

The present inventors also focused on improving the polymerizable composition employed in fabricating the organic layer to achieve a laminate of organic/inorganic lamination type that was capable of water vapor permeability such as that set forth above. Specifically, they focused on enhancing the polymerization rate of the polymerizable compound contained in the polymerizable composition. Further, the present inventors presumed that, if the refractive index of the layer formed from the composition containing the related polymerizable compound is high, a barrier laminate affording both good gas barrier properties and antireflection performance can be provided. Based on the above presumption, the present inventors conducted further extensive research, resulting in the discovery of a novel polymerizable compound that had a high polymerization rate and was capable of providing an organic layer of high refractive index.

Specifically, the above problems are solved by means <1> below, and preferably means <2> to <18> below.

<1> A barrier laminate comprising at least one organic layer and at least one inorganic barrier layer, the organic layer being formed by curing a polymerizable composition comprising a polymerizable compound having two or more polymerizable groups, and the total quantity of uncured component in the organic layer being 1.5 weight % or less of the total weight of the organic layer.

<2> The barrier laminate according to <1>, wherein the polymerizable compound comprises one or more aromatic ring per molecule.

<3> The barrier laminate according to <1>, wherein the polymerizable compound comprises 2 to 8 aromatic rings and 2 to 8 polymerizable groups per molecule.

<4> The barrier laminate according to any one of <1> to <3>, wherein the polymerizable groups present in the polymerizable compound are (meth)acryloyloxy groups.

<5> The barrier laminate according to any one of <1> to <4>, wherein at least 75 weight % of the total solid fraction of the polymerizable composition is a polymerizable compound having 2 or more polymerizable groups.

<6> The barrier laminate of any one of <1> to <5>, wherein the polymerizable compound is the compound denoted by general formula (1) and/or the compound denoted by general formula (2):

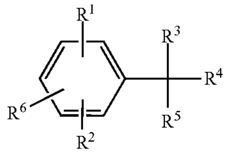

(1)

in general formula (1), each of $R^1$ and $R^2$ denotes hydrogen atom, methyl group, or cyclohexyl group; $R^3$ denotes hydrogen atom, methyl group, or a group denoted by general formula (a) below; $R^4$ denotes hydrogen atom, methyl group, or group denoted by formula (a) below; $R^5$ denotes hydrogen atom or a group selected from group A below; $R^6$ denotes a monovalent substituent comprising a polymerizable group; and the compound denoted by general formula (1) comprises at least two polymerizable groups:

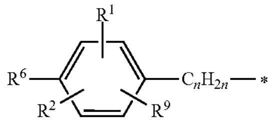

(a)

in general formula (a), each of $R^1$, $R^2$, and $R^9$ denotes hydrogen atom, methyl group, or cyclohexyl group; $R^6$ denotes a monovalent substituent comprising a polymerizable group; n denotes an integer of from 0 to 2; and * denotes a binding position, (group A)

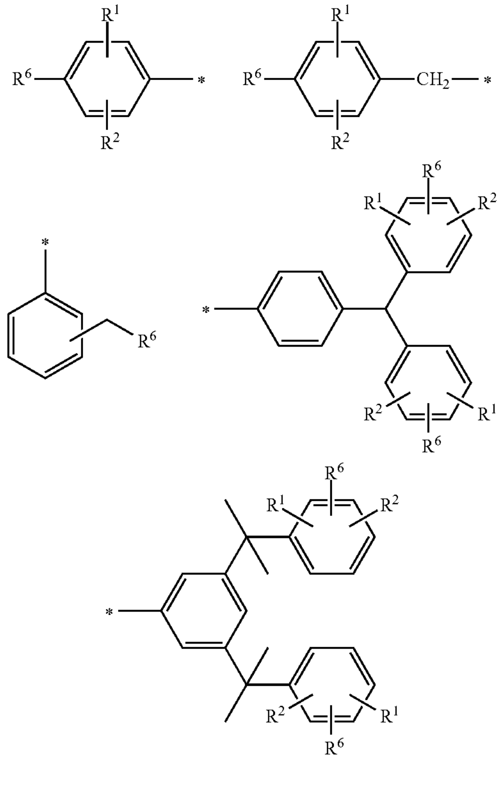

-continued

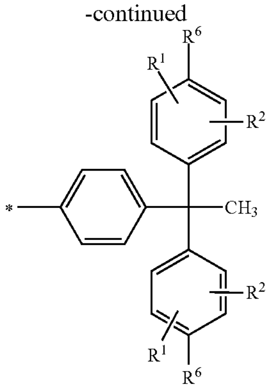

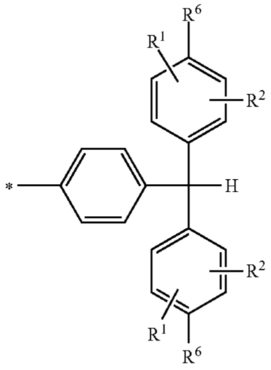

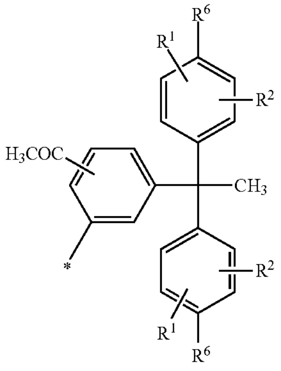

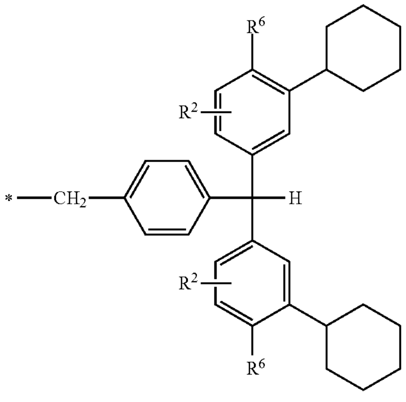

wherein each of $R^1$ and $R^2$ denotes hydrogen atom, methyl group, or cyclohexyl group; $R^6$ denotes a monovalent substituent comprising a polymerizable group; and * denotes a binding position;

(2)

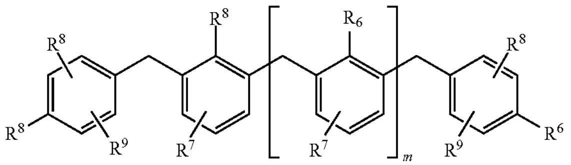

in general formula (2), $R^6$ denotes a monovalent substituent comprising a polymerizable group; each of $R^7$, $R^8$, and $R^9$ denotes hydrogen atom, methyl group, or cyclohexyl group; and m denotes 0 or 1.

<7> The barrier laminate according to any one of <1> to <6>, wherein the polymerizable compound is a polymerizable compound denoted by general formula (11):

general formula (11)

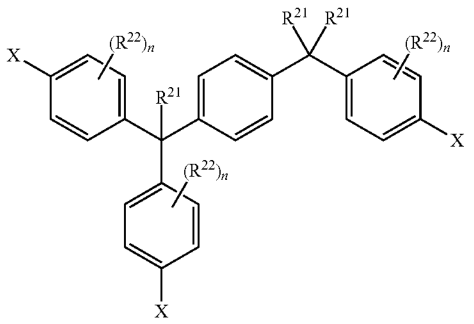

in general formula (11), $R^{21}$ denotes hydrogen atom or methyl group; $R^{22}$ denotes methyl group or cyclohexyl group; n denotes an integer of from 0 to 2; and each instance of X independently denotes a group denoted by any one of formulas (a) to (d) below:

(a)

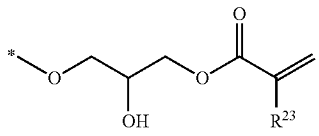

(b)

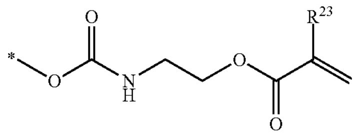

(c)

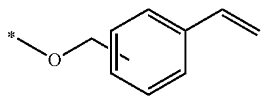

(d)

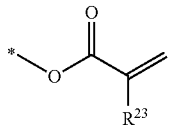

in formulas (a), (b), and (d), $R^{23}$ denotes hydrogen atom or methyl group and * denotes a binding position.

<8> The barrier laminate according to <7>, wherein $R^{21}$ denotes methyl group.

<9> The barrier laminate according to <7> or <8>, wherein n denotes 0.

<10> The barrier laminate according to any one of <1> to <9>, which comprises the inorganic barrier layer on the surface of the organic layer.

<11> The barrier substrate according to any one of <1> to <10>, which has a structure formed by laminating the inorganic barrier layer, organic layer, and inorganic barrier layer in that order in mutually adjacent fashion.

<12> A gas barrier film wherein the barrier laminate according to any one of <1> to <11> is provided on a substrate film.

<13> A device comprising the barrier laminate according to any one of <1> to <11> or the gas barrier film according to <12>.

<14> A solar cell element or an organic EL element comprising the barrier laminate according to any one of <1> to <11> or the gas barrier film according to <12>.

<15> A device optical element comprising the barrier laminate according to any one of <1> to <11> or the gas barrier film according to <12>.

<16> A bag for sealing a device, comprising the barrier laminate according to any one of <1> to <11> or the gas barrier film according to <12>.

<17> A method of manufacturing the barrier laminate according to any one of <1> to <11>, comprising removing impurities from a composition (A) comprising a polymerizable compound, and then curing a polymerizable composition comprising the composition (A) comprising a polymerizable compound to form an organic layer.

<18> A method of manufacturing a device, comprising providing a barrier laminate by the method of manufacturing a barrier laminate according to <17>.

The present inventors discovered a polymerizable compound that made it possible to provide a cured product of high refractive index by rapid curing with UV radiation, and devised <19> to <26> below.

<19> A polymerizable compound denoted by general formula (11):

general formula (11)

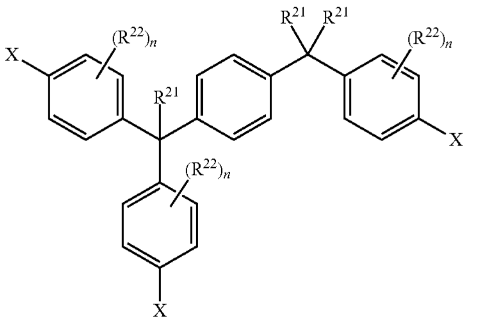

in general formula (11), $R^{21}$ denotes hydrogen atom or methyl group; $R^{22}$ denotes methyl group or cyclohexyl group; n denotes an integer of 0 to 2; and each instance of X independently denotes a group denoted by any one of formulas (a) to (d) below:

(a)

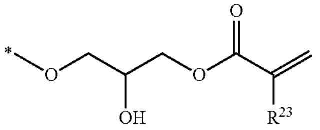

(b)

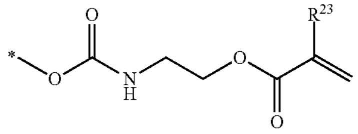

(c)

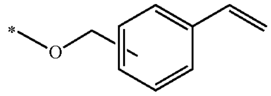

(d)

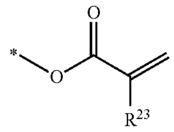

in formulas (a), (b), and (d), $R^{23}$ denotes hydrogen atom or methyl group and * denotes a binding position.

<20> The polymerizable compound according to <19>, wherein $R^{21}$ denotes methyl group.

<21> The polymerizable compound according to <19> or <20>, wherein n denotes 0.

<22> A polymerizable composition comprising the polymerizable compound according to any one of <19> to <21>.

<23> The polymerizable composition according to <22>, further comprising a photopolymerization initiator.

<24> The polymerizable composition of <22> or <23>, used to form a barrier laminate.

<25> A cured product of the polymerizable composition according to any one of <22> to <24>.

<26> A laminate film, comprising an organic layer formed by curing the polymerizable composition according to any one of <22> to <24> on a substrate film.

Effect of the Invention

Use of the organic layer relating to the present invention makes it possible to enhance adhesion of the organic layer to the inorganic barrier layer with little gas generation. Further, it is also possible to provide a barrier laminate with enhanced heat resistance performance. The present invention provides a polymerizable composition capable of providing an organic layer of high refractive index and high polymerization rate by curing, and a novel polymerizable compound that is contained in such a polymerizable composition.

MODES OF CARRYING OUT THE INVENTION

The present invention will be described in detail below. In the present Description, the word "to" in a numeric range is used to mean a range that includes the preceding and succeeding numbers as minimum and maximum values, respectively. In the present Description, the term "organic EL element" means an organic electroluminescent element. In the present Description, the term "(meth)acrylate" is used to mean both "acrylate" and "methacrylate." In the present Description, the "group" in "alkyl group" and the like, unless specifically stated otherwise, can be substituted or unsubstituted. In the case of a group with a limited number of carbon atoms, the number of carbon atoms includes the number of carbon atoms of any substituents.

<The Barrier Laminate>

The barrier laminate of the present invention is characterized by comprising at least one organic layer and at least one inorganic barrier layer, in that the organic layer is formed by curing a polymerizable composition containing a polymerizable compound having at least two polymerizable groups, and in that the total quantity of uncured compounds in the organic layer account for 1.5 weight % or less of the total weight of the organic layer. Employing a barrier laminate having such an organic layer makes it possible to enhance the adhesion of the organic layer and the inorganic layer and enhance the heat resistance performance.

The barrier laminate of the present invention is preferably a barrier laminate further having a second inorganic barrier layer on the surface of the organic layer, and more preferably a barrier laminate further having a second organic layer on the surface of the second inorganic barrier layer.

Figure 1:
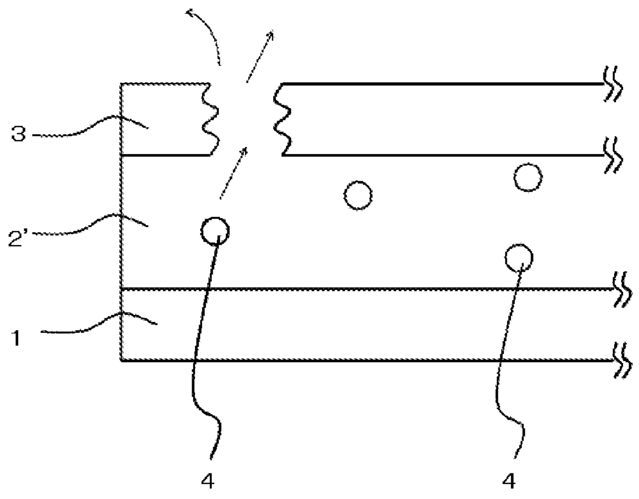
FIG. 1 is a schematic sectional view showing how gas is released from a conventional barrier laminate.
Figure 2:
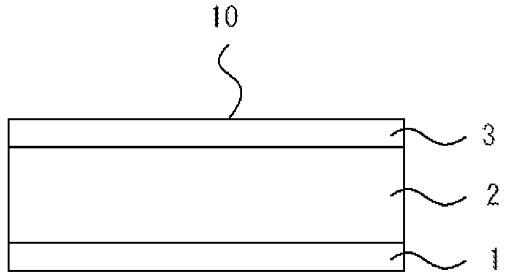
FIG. 2 is a schematic sectional view showing an example of the barrier laminate of the present invention.

In FIG. 2, a schematic sectional view of an example of the barrier laminate of the present invention, 1 denotes the first inorganic barrier layer, 2 denotes an organic layer, 3 denotes the second inorganic barrier layer, and 10 denotes a barrier laminate.

In the course of forming an organic layer, a polymerizable composition is generally applied on an inorganic barrier layer and cured. Here, for example, when employing a polymerizable composition such as that described in Japanese Unexamined Patent Publication (KOKAI) No. 2010-228446, uncured components (catalysts, by-products, and the like) contained in the polymerizable compound end up remaining in the organic layer. The uncured components that remain are known to release a large amount of gas during subsequent processes, such as during the stage of incorporation into a device. Particularly in the case of a structure such as the implementation form shown in FIG. 2, where an organic layer is sandwiched between two inorganic barrier layers, the gas deriving from uncured components ends up damaging the inorganic layer. By contrast, in the present invention, purification and the like are conducted so that no non-polymerizable compounds are present in the polymerizable compound in the first place. Thus, the above problem does not occur. That is, the barrier laminate of the present invention ensures adhesion between the organic layer and inorganic barrier layer while maintaining good gas barrier properties even at high temperature and during vacuum processing.

In FIG. 2, the barrier laminate has only one organic layer 2, but can also have a second organic layer. When the barrier laminate has two or more organic layers, it suffices for just the layer that is adjacent to the inorganic barrier layer to be the above organic layer. That is, in the present invention, a structure in which at least two organic layers and at least two inorganic barrier layers are laminated in alternating fashion is preferable. The number of layers constituting the barrier laminate is not specifically limited. Typically, 2 to 30 layers are preferable and 3 to 20 layers are more preferable.

(The Organic Layer)

At least one of the organic layers in the present invention contains a polymer that is obtained by polymerizing a polymerizable composition in the present invention. The polymerizable composition in the present invention comprises a polymerizable compound having two or more polymerizable groups per molecule. However, it preferably contains a polymerizable compound having one or more aromatic ring and two or more polymerizable groups per molecule, more preferably contains a polymerizable compound having 2 to 8 aromatic rings and 2 to 8 polymerizable groups per molecule, and further preferably, contains a polymerizable compound having 2 to 6 aromatic rings and 2 to 6 polymerizable groups per molecule. The polymerizable groups are preferably (meth)acryloyloxy groups. The aromatic rings are preferably benzene rings. The polymerizable composition in the present invention preferably contains at least one from among the compound denoted by general formula (1) and the compound denoted by general formula (2).

In the present invention, in the course of the compound having two or more polymerizable groups per molecule forming a three-dimensional network structure with heat resistance, keeping the uncured portion to 1.5 weight % or less achieves the effect of the present invention. The total quantity of uncured components can be kept to 1.5 weight % or less of the total weight of the organic layer by removing impurities from the polymerizable composition. More specifically, it can be achieved by purifying composition (A) containing a polymerizable compound having two or more polymerizable groups per molecule. Examples of means of the purification include column chromatography, washing with water, recrystallization, and distillation. Polymerizable compounds obtained as commercial and synthetic products are not pure polymerizable compounds, and actually are provided as composition (A) containing trace amounts of impurities. Barrier laminates conventionally have been formed without paying any attention to these trace amounts of impurities. However, it has been discovered that removing the impurities from composition (A) containing the polymerizable compound makes it possible to markedly improve barrier properties and adhesion.

The compound denoted by general formulas (1) and (2) will be described below.

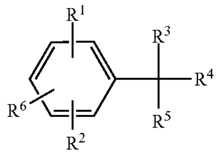

(1)

In general formula (1), each of $R^1$ and $R^2$ denotes a hydrogen atom, methyl group, or cyclohexyl group; $R^3$ denotes a hydrogen atom, methyl group, or the group denoted by general formula (a) below; $R^4$ denotes a hydrogen atom, methyl group, or the group denoted by formula (a) below; $R^5$ denotes a hydrogen atom or a group selected from group A below; $R^6$ denotes a monovalent substituent containing a polymerizable group; and the compound denoted by general formula (1) contains at least 2 polymerizable groups.

(a)

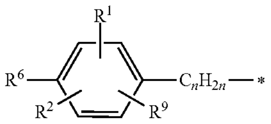

In general formula (a), each of $R^1$, $R^2$, and $R^9$ denotes a hydrogen atom, methyl group, or cyclohexyl group; $R^6$ denotes a monovalent substituent containing a polymerizable group; n denotes an integer of from 0 to 2; and * denotes a binding position.

(Group A)

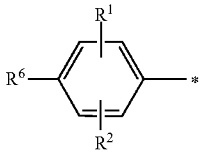

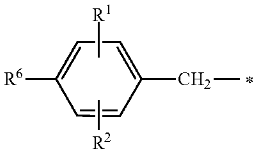

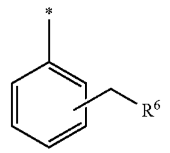

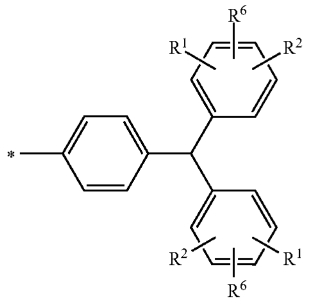

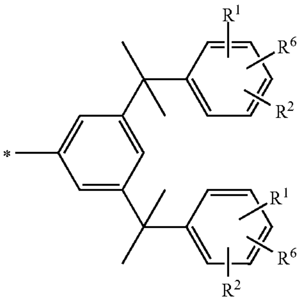

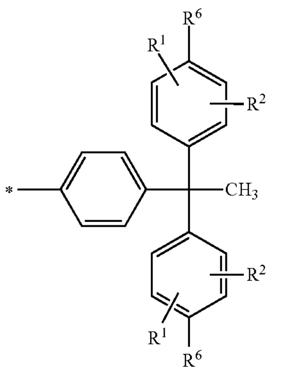

-continued

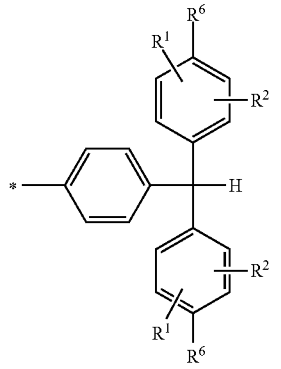

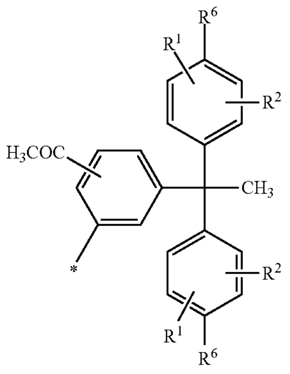

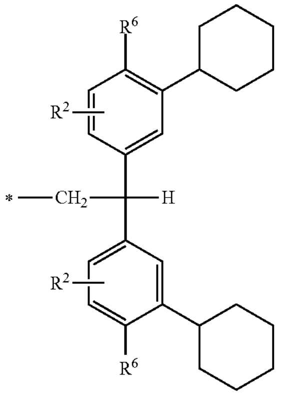

In the formulas, each of $R^1$ and $R^2$ denotes a hydrogen atom, methyl group, or cyclohexyl group; $R^6$ denotes a monovalent substituent containing a polymerizable group; and * denotes a binding position.

(2)

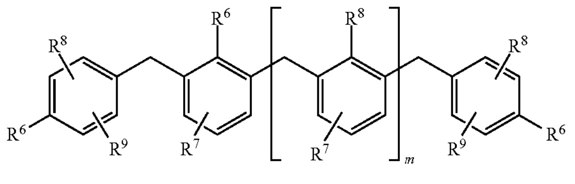

In general formula (2), $R^6$ denotes a monovalent substituent containing a polymerizable group; each of $R^7$, $R^8$, and $R^9$ denotes a hydrogen atom, methyl group, or cyclohexyl group; and m denotes 0 or 1.

When two or more instances of $R^1$ to $R^9$ are contained per molecule, they can be identical or different.

Examples of the substituent contained in polymerizable group $R^6$ include groups containing a combination of one or more from among —$CR^{10}_2$— ($R^{10}$ being a hydrogen atom or a substituent), —CO—, —O—, phenylene group, —S—, —C≡C—, —$NR^{11}$— ($R^{11}$ being a hydrogen atom or a substituent), and —$CR^{12}$=$CR^{13}$— (each of $R^{12}$ and $R^{13}$ being a hydrogen atom or a substituent) with a polymerizable group. A group containing a combination of one or more from among —$CR^{14}_2$— ($R^{14}$ being a hydrogen atom or substituent), —CO—, —O—, and phenylene group with a polymerizable group is more preferable.

Substituents of $R^{10}$ to $R^{14}$ are preferably methyl groups or hydroxyl groups.

The molecular weight of at least one instance of $R^6$ is preferably 10 to 250, more preferably 70 to 150.

The binding position of $R^6$ is preferably at least the para position.

n denotes an integer of from 0 to 2.

In the compound denoted by general formula (1) or general formula (2), at least two instances of $R^6$ preferably have identical structures.

The polymerizable group of general formula (1) or (2) is preferably a (meth)acryloyl group or an epoxy group, and more preferably a (meth)acryloyl group.

The number of polymerizable groups present in general formula (1) or (2) is preferably 2 or more, more preferably 3 or more. The upper limit is not specifically determined. However, 8 or fewer are preferable and 6 or fewer are more preferable.

The molecular weight of the compound denoted by general formula (1) or (2) is preferably 600 to 1,400, more preferably 800 to 1,200.

Among the compounds denoted by general formula (1) and (2), compounds denoted by general formula (1) are more preferable.

Examples of particularly preferable compounds from among the compounds denoted by general formula (1) include the polymerizable compounds denoted by general formula (11) below:

general formula (11)

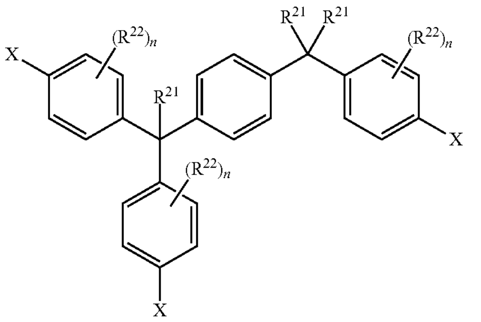

In general formula (11), $R^{21}$ denotes a hydrogen atom or a methyl group; $R^{22}$ denotes a methyl group or a cyclohexyl group; n denotes an integer of from 0 to 2; and each instance of X independently denotes a group denoted by any one of (a) to (d) below.

(a)

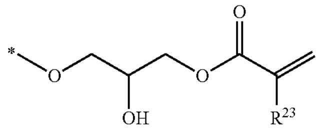

(b)

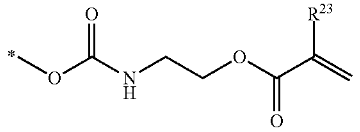

(c)

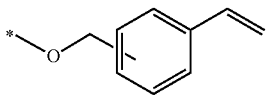

(d)

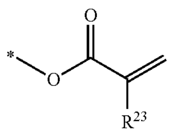

In formulas (a), (b), and (d), $R^{23}$ denotes a hydrogen atom or a methyl group and * denotes a binding position.

In general formula (11), $R^{21}$ is preferably a methyl group. $R^{22}$ is preferably a hydrogen atom.

Multiple instances of $R^{21}$, $R^{22}$, and X can be present in a single compound, and the multiple instances of each of $R^{21}$, $R^{22}$, and X can be identical or different, and are preferably identical. When two or more instances of $R^{23}$ are present in a single compound, the two or more instances of $R^{23}$ can be identical or different.

n is preferably 0 or 1, preferably 0.

The polymerizable composition in the present invention can contain one compound denoted by general formula (1) or (2), or two or more such compounds. Examples of cases where the polymerizable composition contains two or more such compounds include compositions containing compounds having differing numbers of instances of $R^6$ that are of identical structure, as well as isomers thereof.

Specific examples of polymerizable compounds denoted by general formulas (1) and (2) of the present invention are given below. The compound of the present invention is not limited to these compounds.

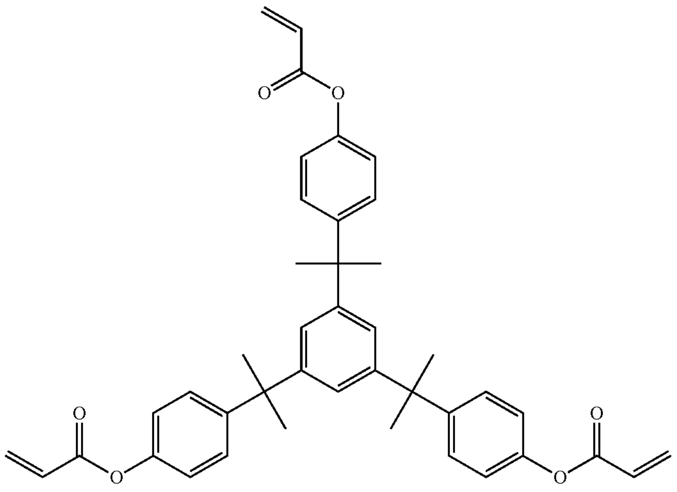
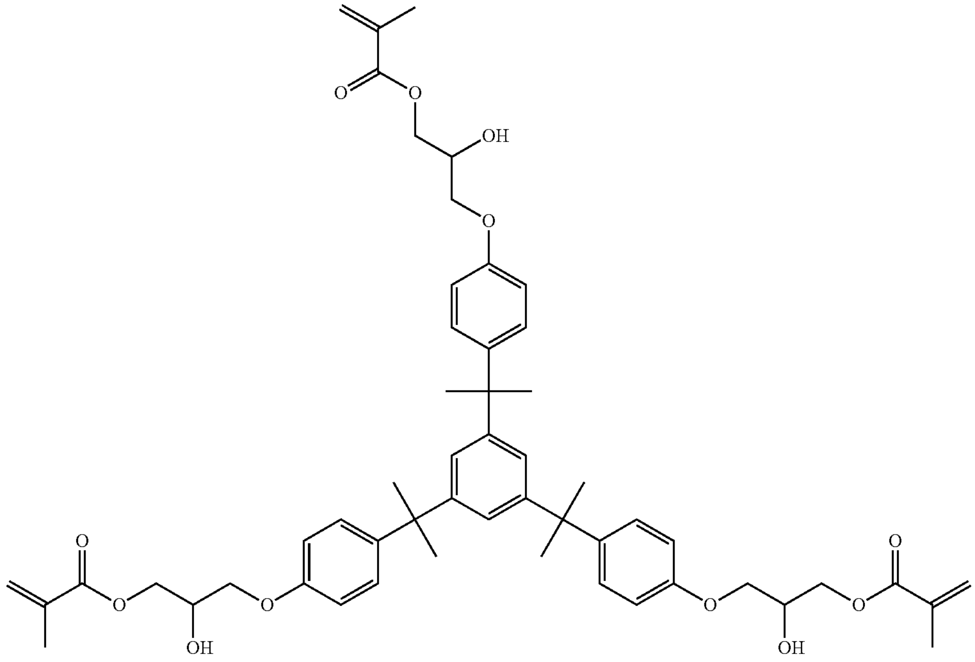
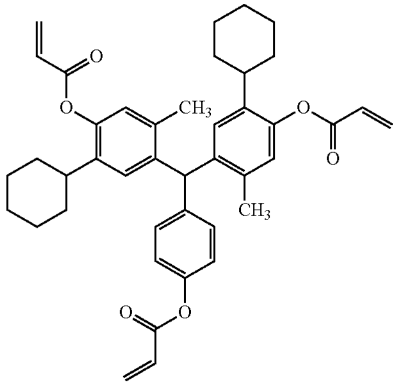
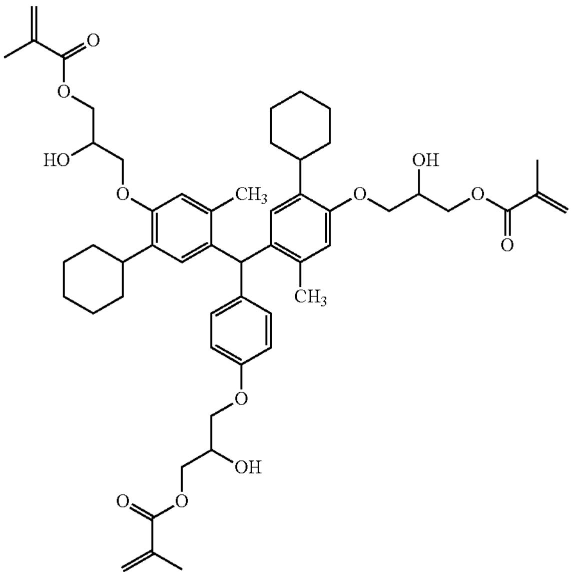

-continued
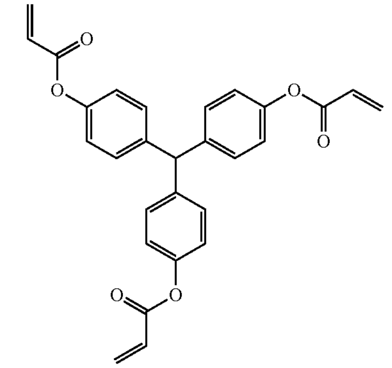
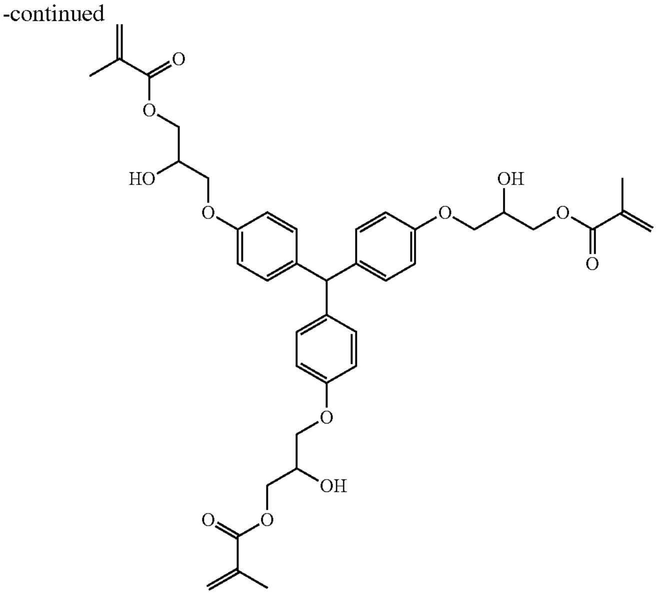
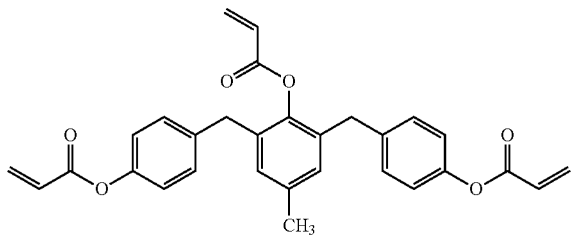
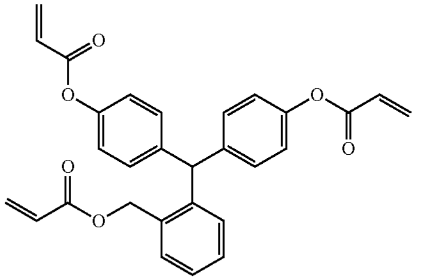
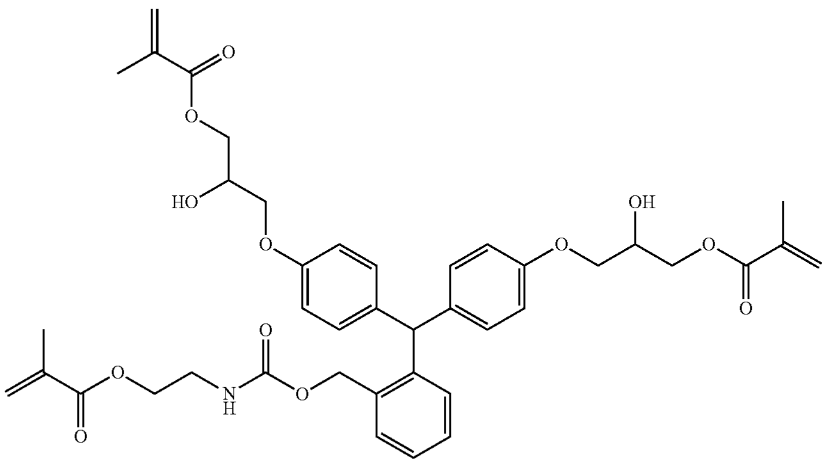

-continued
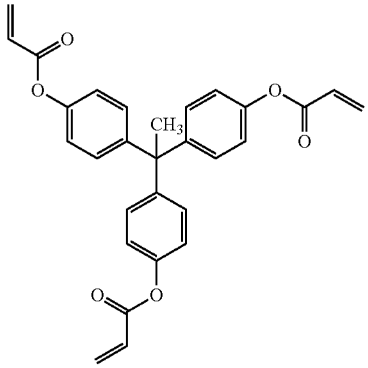
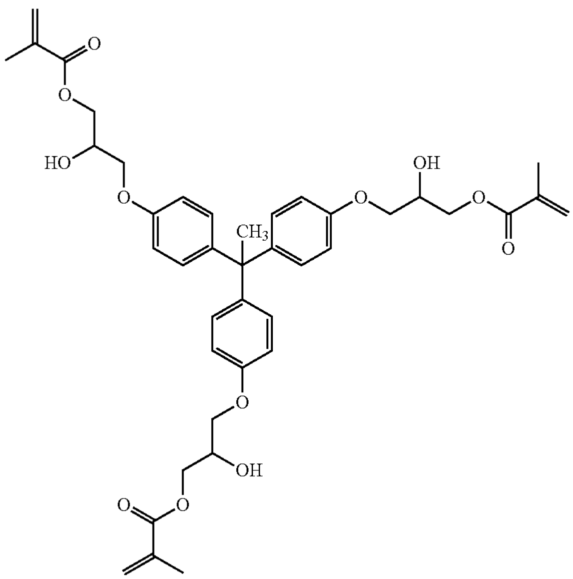
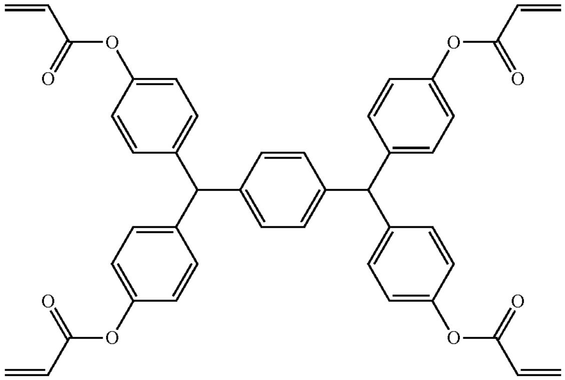
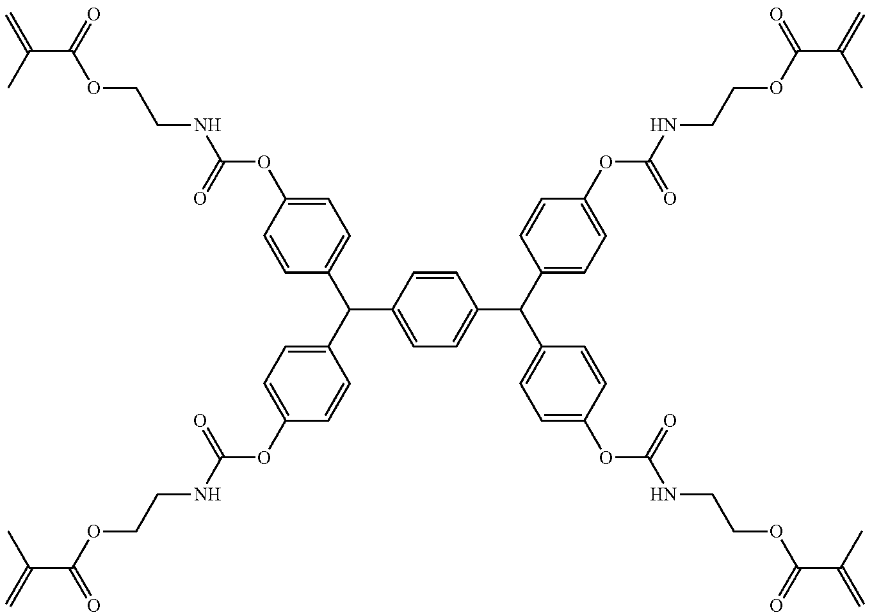

-continued
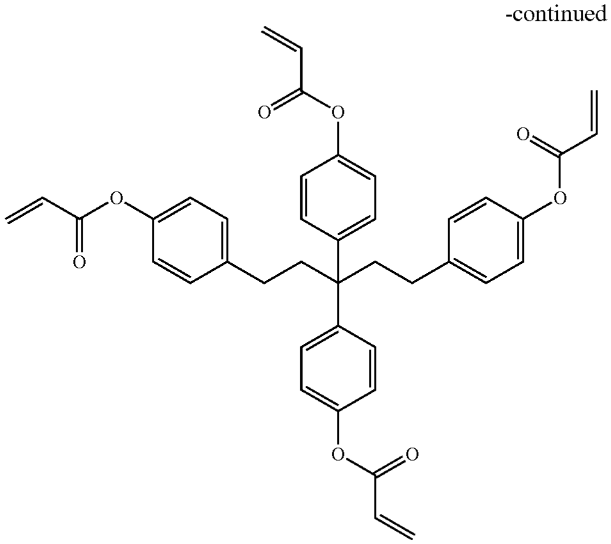
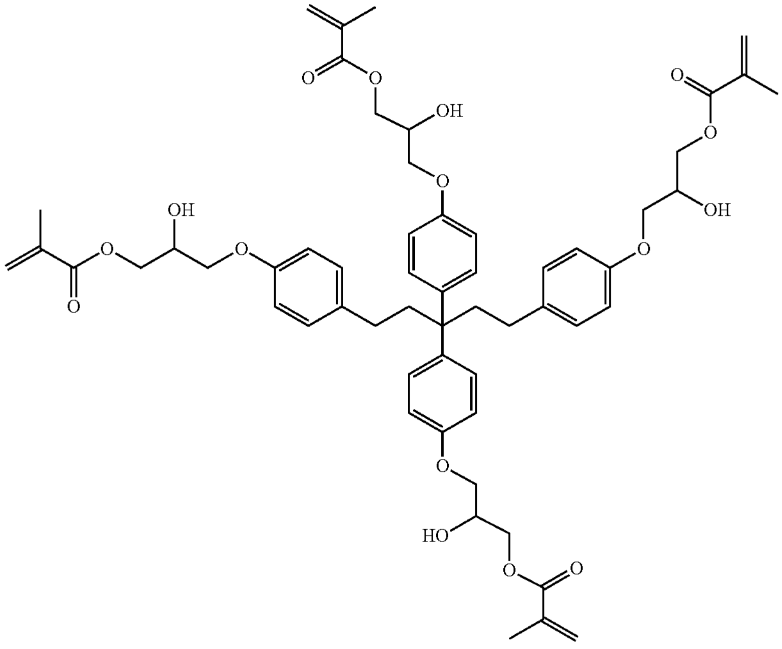
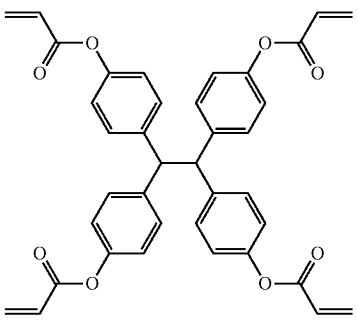
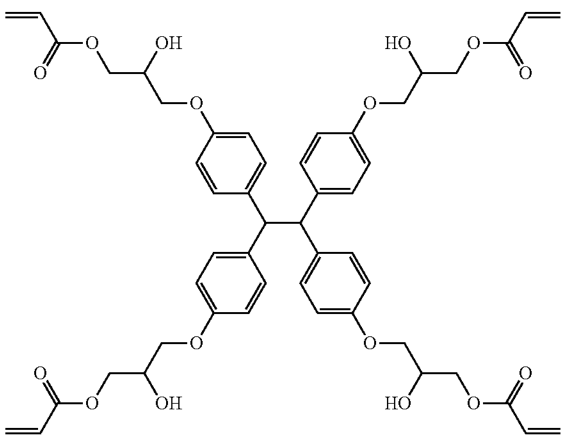

-continued

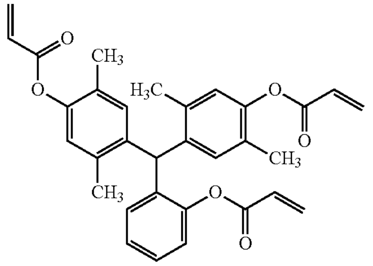

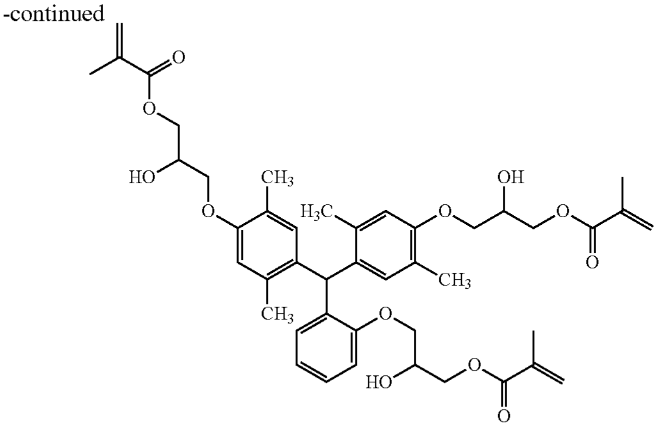

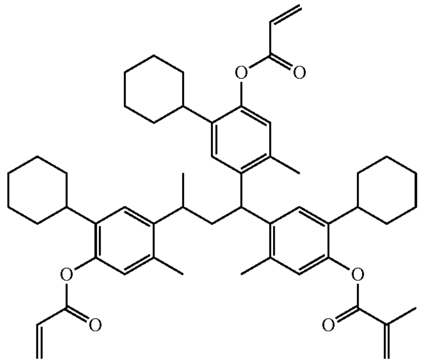

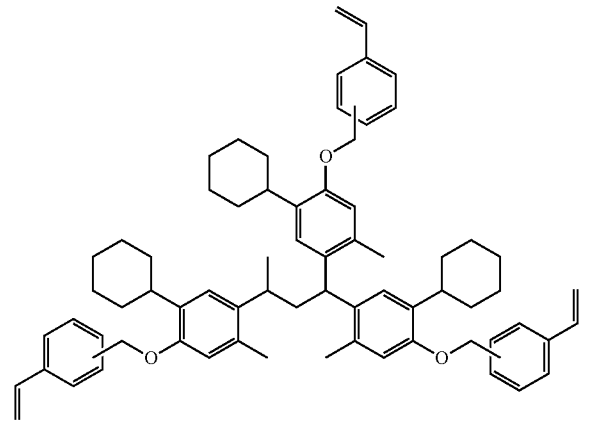

The above compounds are available as commercial products. The above compounds can also be synthesized by known methods. For example, epoxy acrylates can be obtained by reacting an epoxy compound and acrylic acid. These compounds normally produce bifunctional, trifunctional, and pentafunctional compounds and their isomers and the like in the course of a reaction. When it is preferable to separate these isomers, column chromatography can be employed. However, they can also be employed as a mixture in the present invention.

Examples of compounds denoted by general formula (11) are given below. The present invention is not limited thereto.

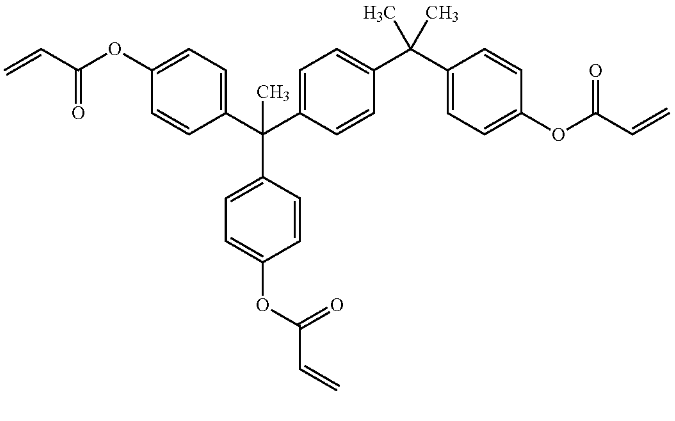

-continued
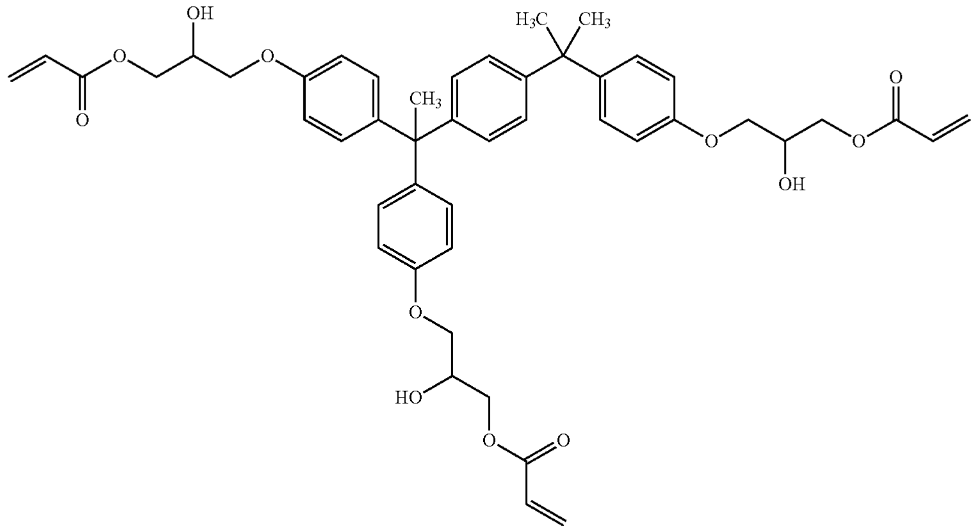
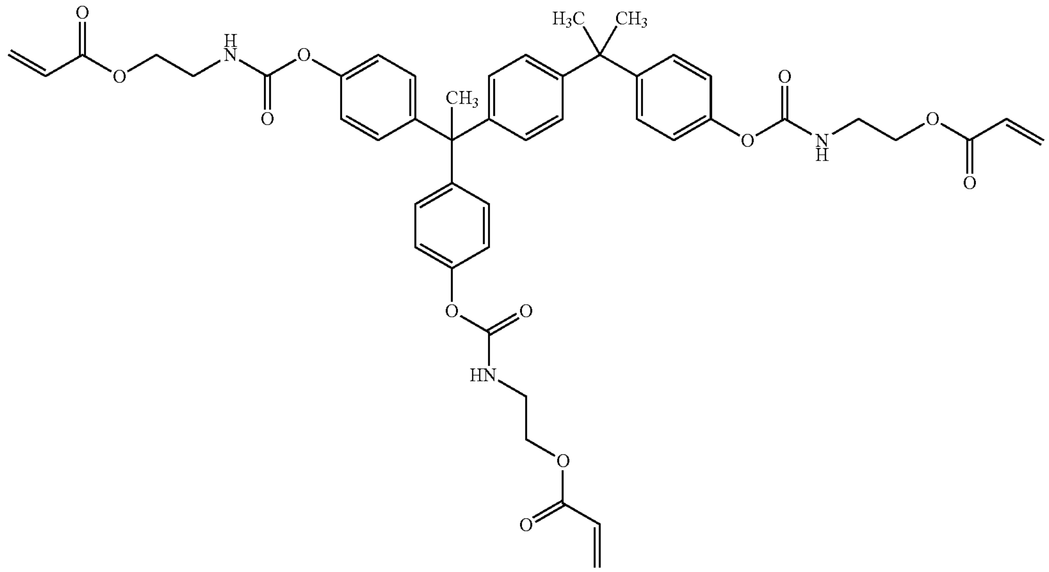
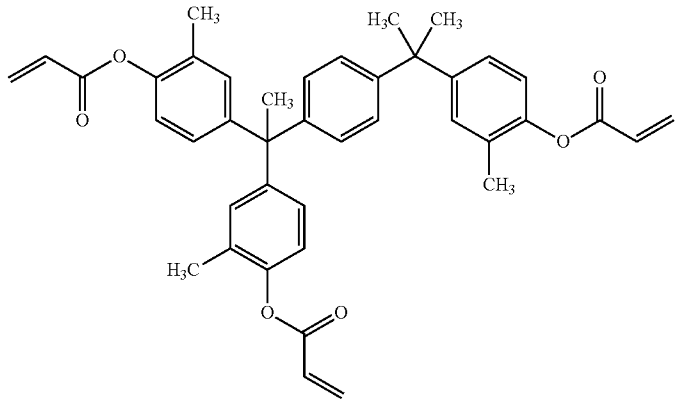

-continued
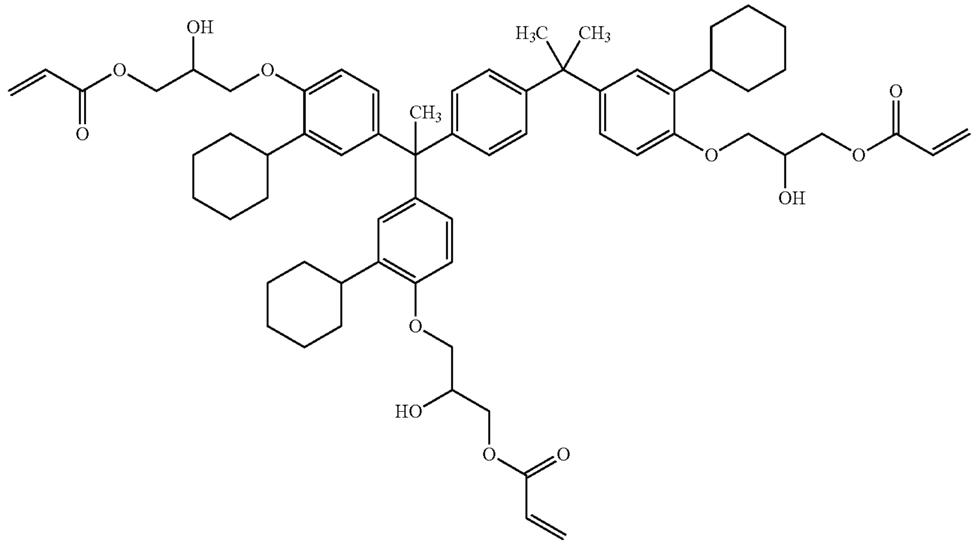
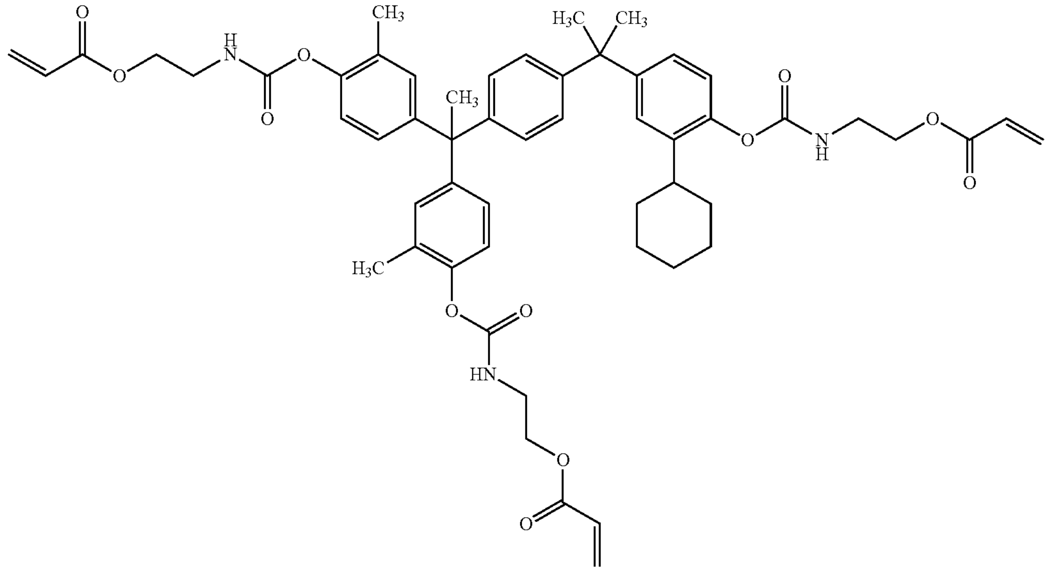
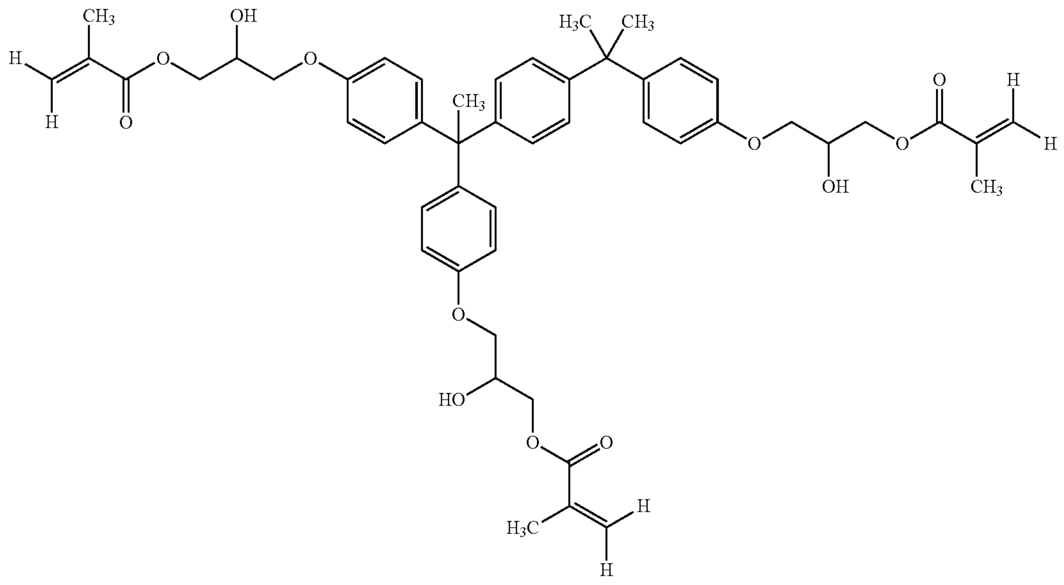 [SMILES: C=C(C)C(=O)OCC(O)COc1ccc(C(C)(C)c2ccc(C(C)(c3ccc(OCC(O)COC(=O)C(=C)C)cc3)c3ccc(OCC(O)COC(=O)C(=C)C)cc3)cc2)cc1]

The compounds denoted by general formula (11) can be obtained by reacting an epoxy compound (i) given below with (meth)acrylic acid, glycidyl methacrylate, or chloromethylstyrene, or by reacting the polyvalent phenol (ii) given below with an isocyanatoalkyl (meth)acrylic acid.

(i)

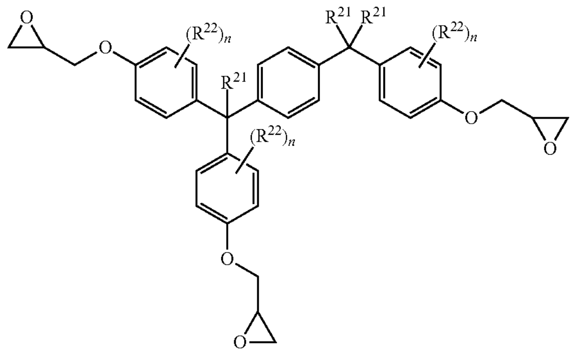

-continued (ii)

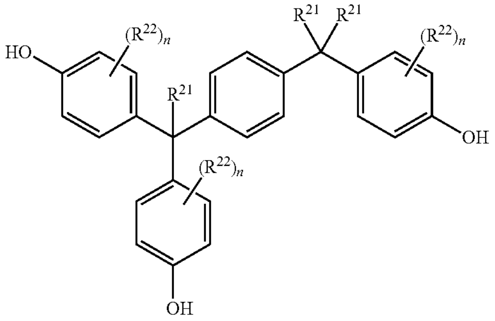

In formulas (i) and (ii), each of $R^{21}$, $R^{22}$, and n are identically defined with $R^{21}$, $R^{22}$, and n, respectively, in general formula (11).

Preferable ranges of $R^{21}$, $R^{22}$, and n in formulas (i) and (ii) are identical to those of $R^{21}$, $R^{22}$, and n in general formula (11).

The following compounds can be employed as polymerizable compounds having two or more polymerizable groups per molecule that are employed in the present invention in addition to the above.

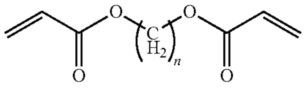

n = 4, 6, 9, 10, 12, 14, 16

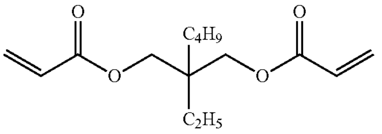

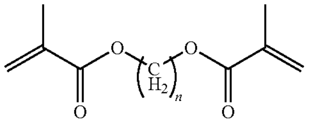

n = 4, 6, 9, 10, 12, 14, 16

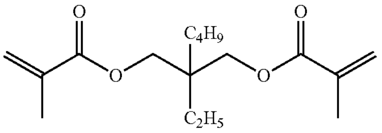

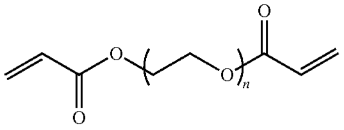

n = 2, 3, 4, 5

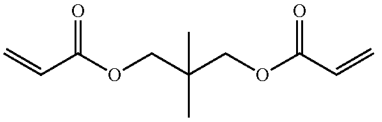

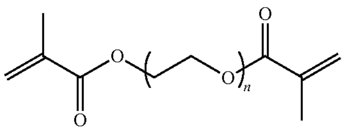

n = 2, 3, 4, 5

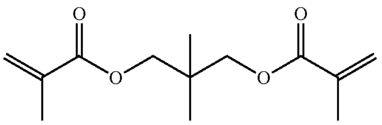

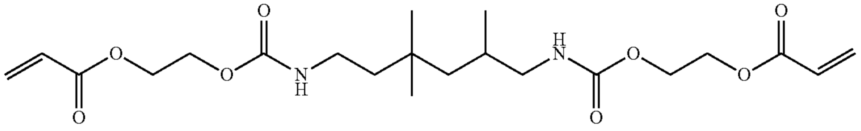

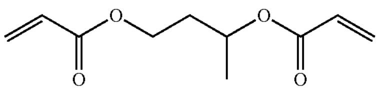

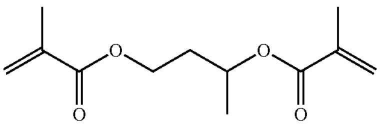

-continued
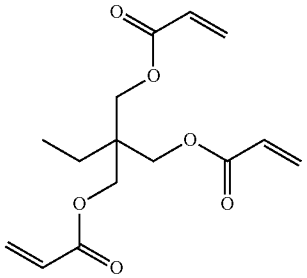
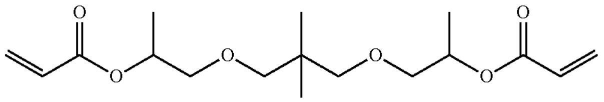
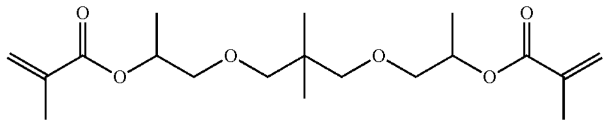
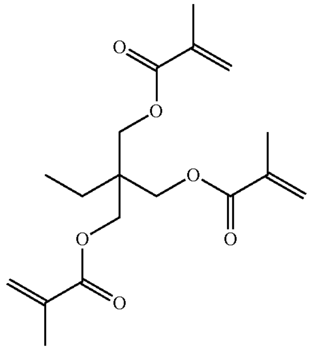
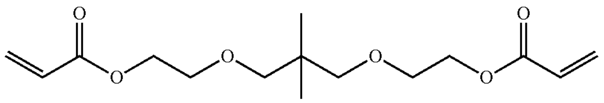
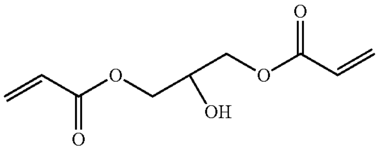
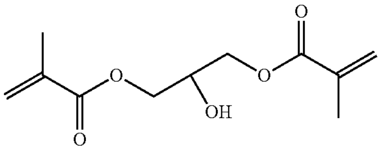
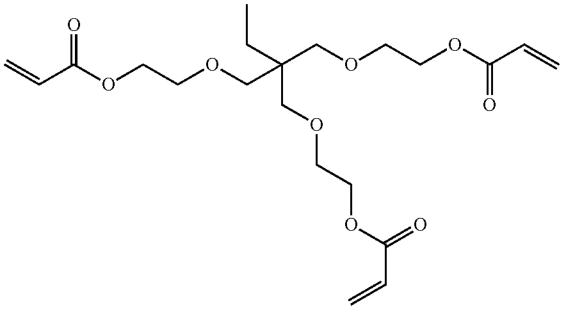
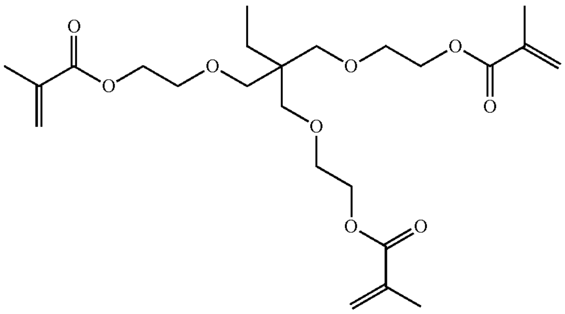
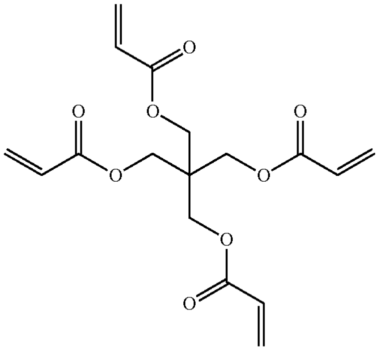
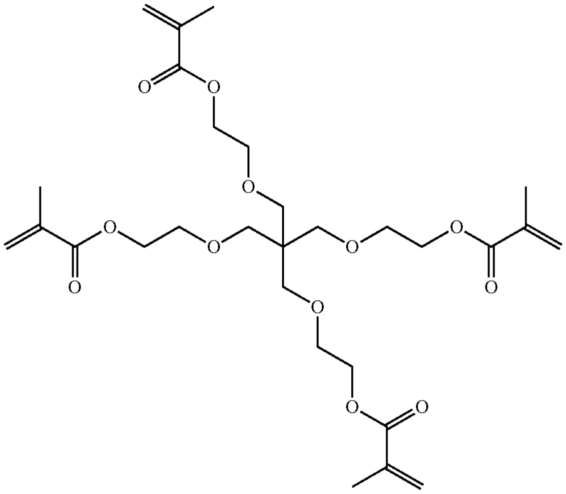

-continued
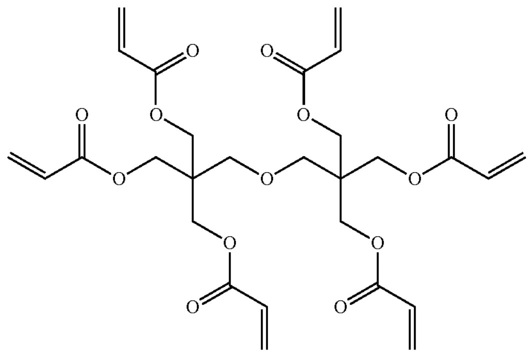
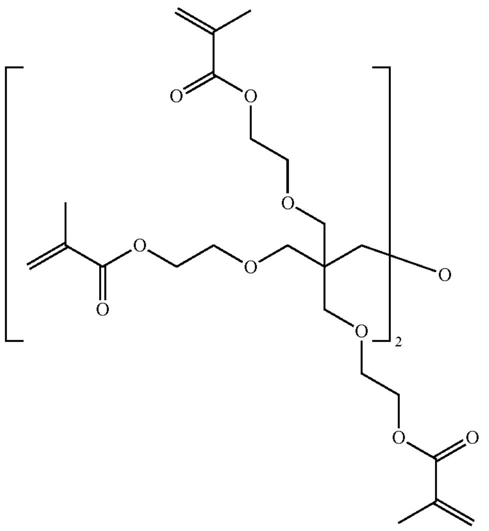
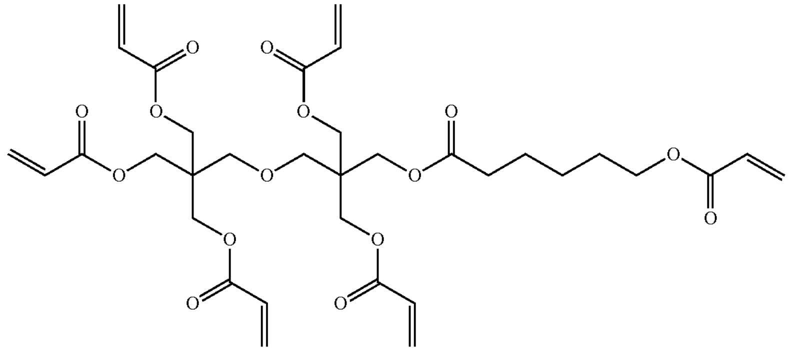
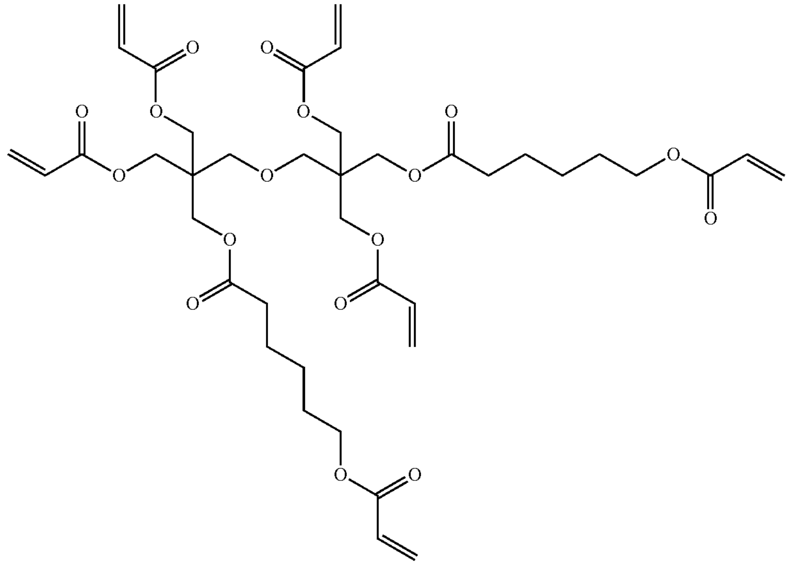

-continued
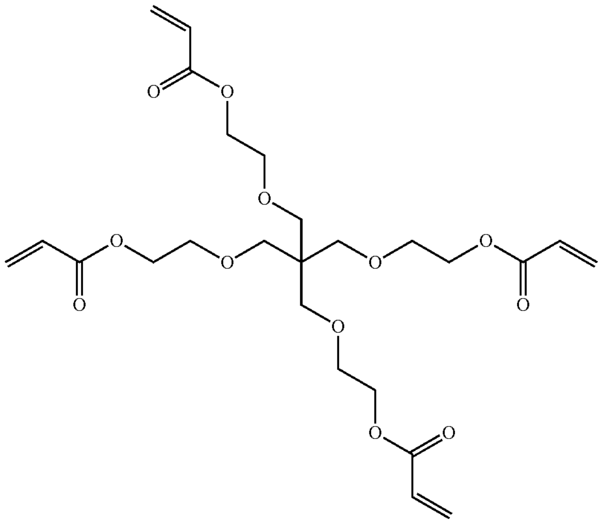
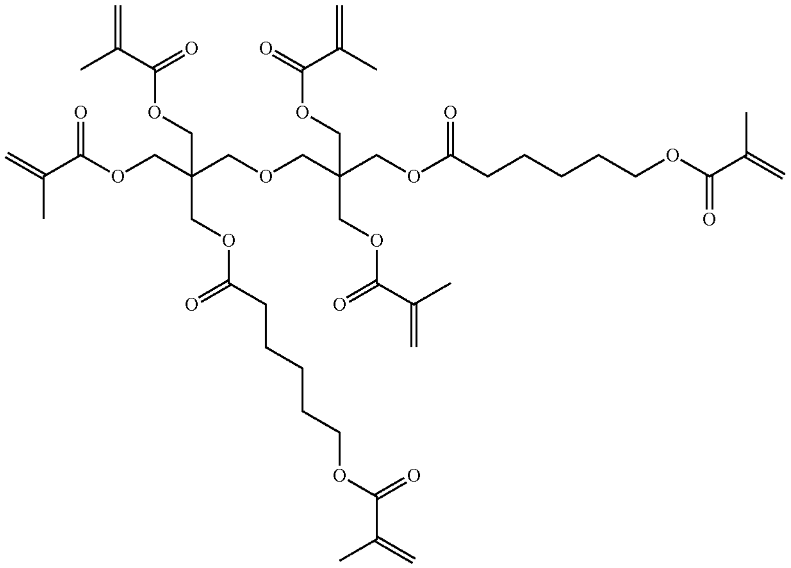
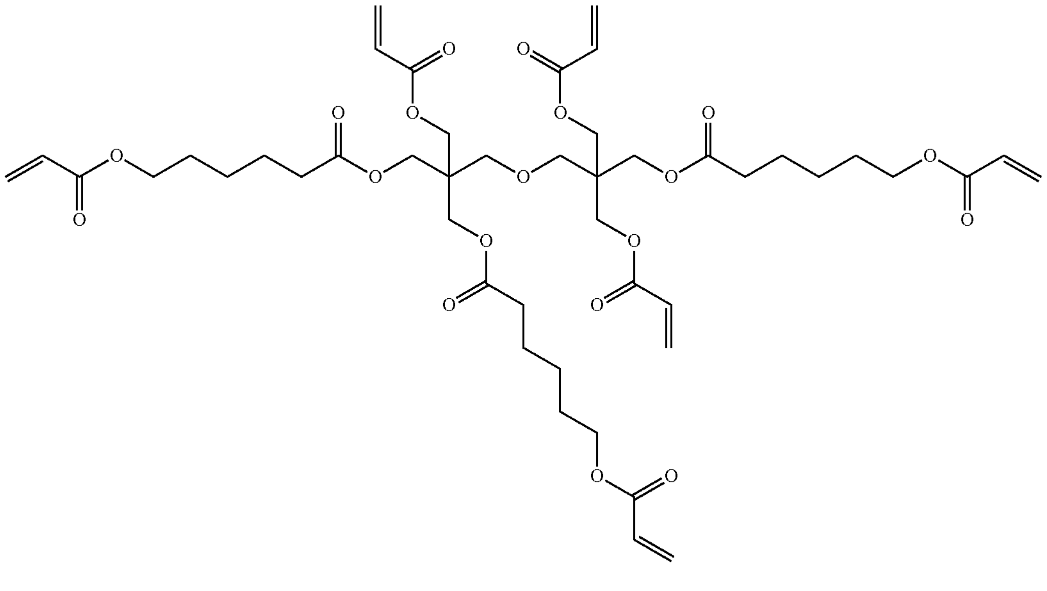

-continued
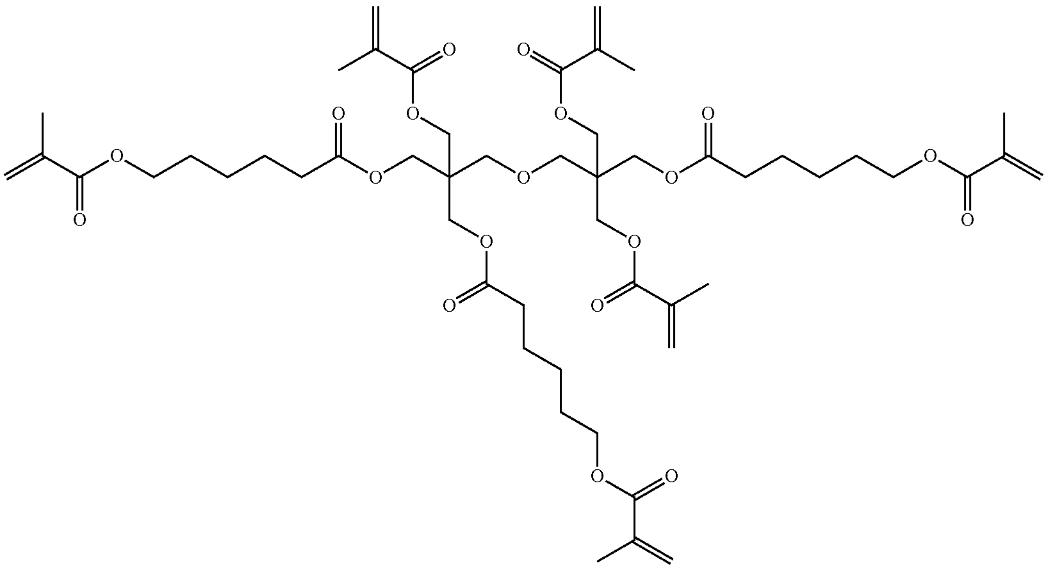
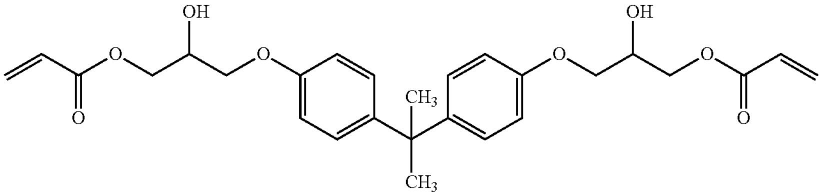
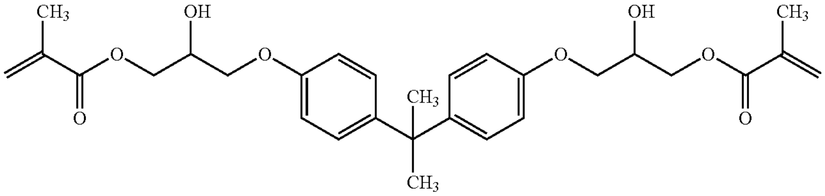
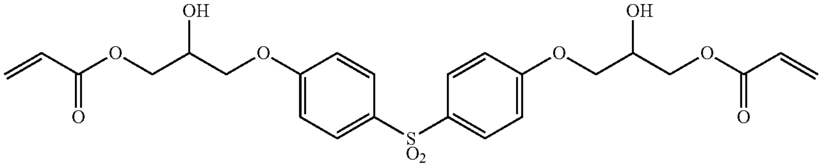
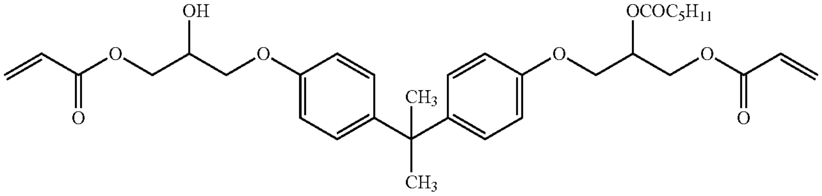
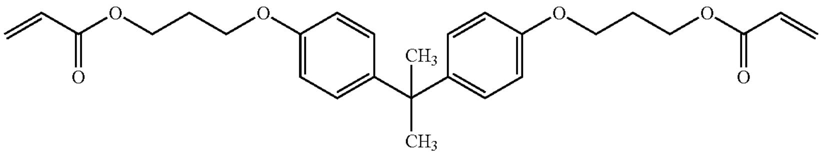
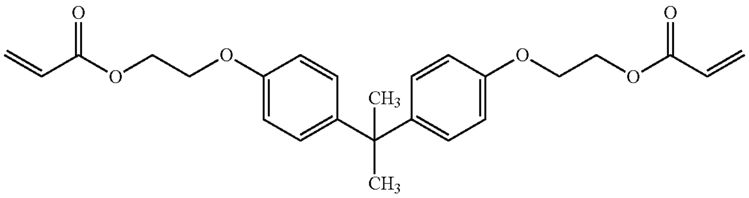

-continued

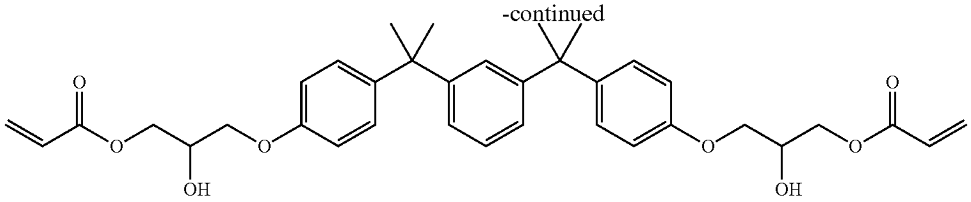

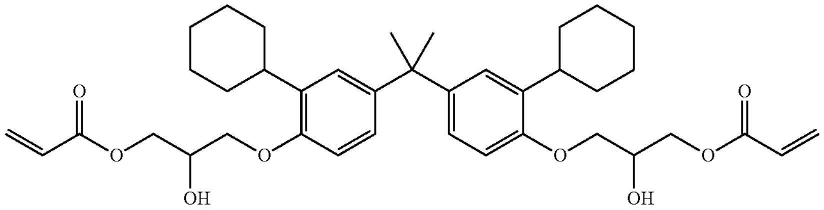

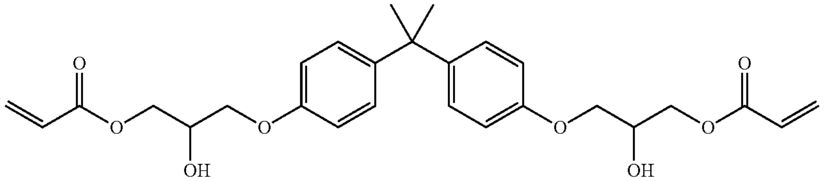

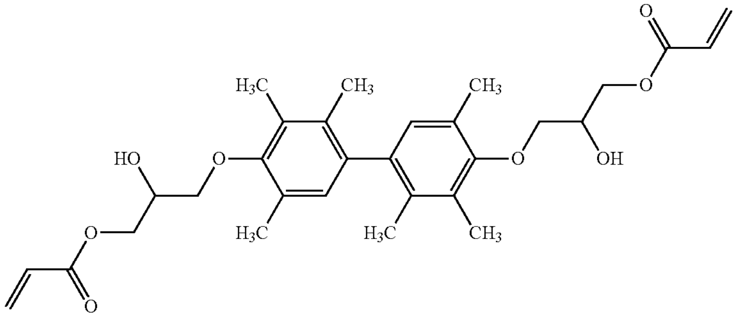

In the polymerizable composition in the present invention, the blending quantity of the polymerizable compound having two or more polymerizable groups per molecule is preferably 30 to 99 weight %, more preferably 50 to 95 weight % based on the solid fraction excluding solvent.

Based on the solid fraction excluding solvent, 60 weight % or more of the total solid fraction of the polymerizable composition in the present invention is preferably comprised of the polymerizable compound having two or more polymerizable groups per molecule (preferably a compound denoted by general formula (1) or (2)), and 75 weight % or more is preferably comprised of the polymerizable compound having two or more polymerizable groups per molecule (preferably a compound denoted by general formula (1) or (2)).

Other Polymerizable Compounds

The polymerizable composition employed in the organic layer in the present invention can contain other polymerizable compounds. The type of polymerizable compound is not specifically determined. Radical polymerizable compounds and/or cation polymerizable compounds having functional groups in the form of ether groups are preferable. Compounds having unsaturated ethylenic bonds on terminals or in side chains and/or compounds having epoxy or oxetane groups on terminals or in side chains are more preferable. Of these, compounds having unsaturated ethylenic bonds on terminals or in side chains are preferable. Examples of compounds having unsaturated ethylenic bonds on terminals or in side chains include (meth)acrylate compounds, acrylamide compounds, styrene compounds, and maleic anhydride. (Meth)acrylate compounds and/or styrene compounds are preferable, and (meth)acrylate compounds are more preferable. The blending quantity of these compounds is preferably 10 weight % or less based on the solid fraction excluding solvent of the polymerizable composition in the present invention.

As (meth)acrylate compound, (meth)acrylates, urethane (meth)acrylates, polyester (meth)acrylates, epoxy (meth) acrylates, and the like are preferable.

As styrene compound, styrene, α-methylstyrene, 4-methylstyrene, divinylbenzene, 4-hydroxystyrene, 4-carboxystyrene, and the like are preferable.

Specific examples of (meth)acrylate compounds that are preferably employed in the present invention will be given below. However, the present invention is not limited thereto.

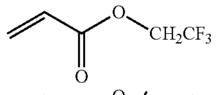
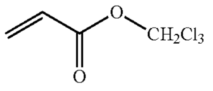

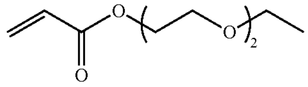

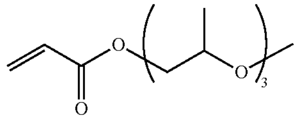

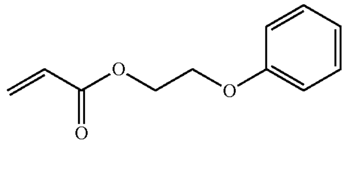

-continued

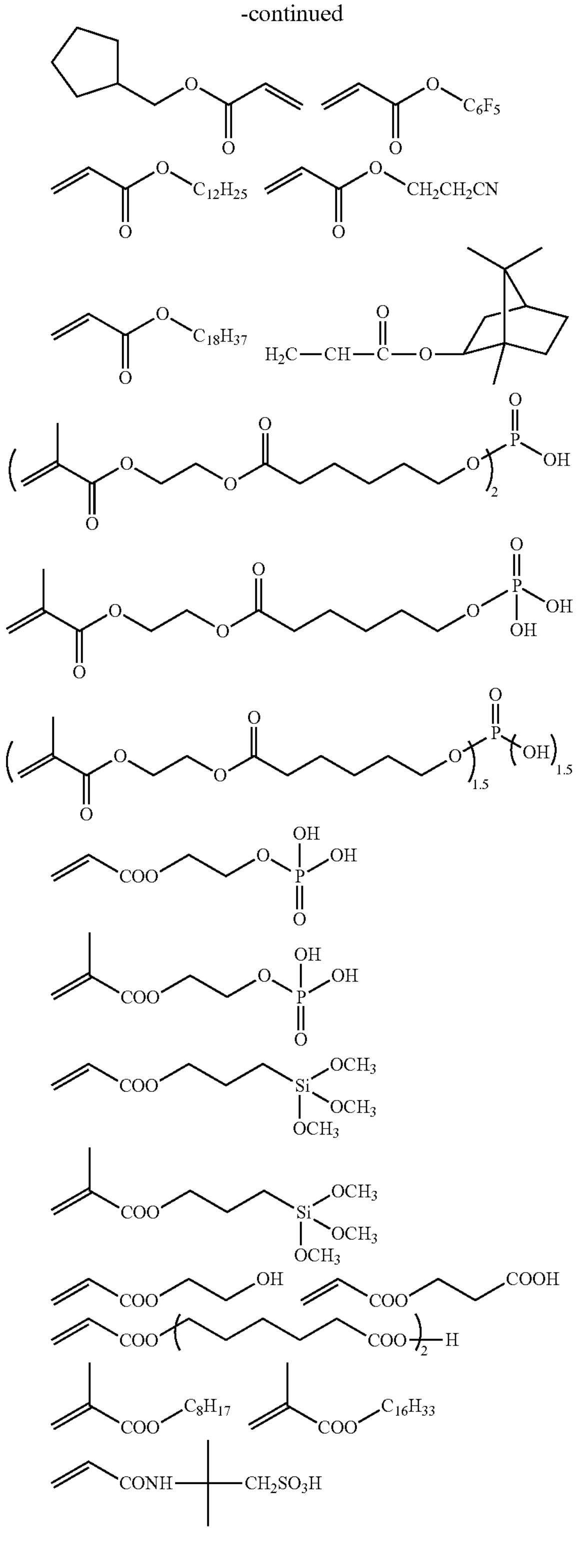

(Polymerization Initiators)

The organic layer in the present invention is normally obtained by applying and curing the polymerizable composition. In the present invention, an organic layer comprised chiefly of a polymer is formed by irradiating the polymerizable composition with heat or any of various energy rays to cause the polymerizable composition to polymerize and crosslink. Examples of energy rays include UV (ultraviolet) light, visible light, infrared light, electron beams, X-rays, and gamma rays. When heat is used to induce polymerization, a thermal polymerization initiator is employed. When UV radiation is employed to induce polymerization, a photopolymerization initiator is employed. When visible light is employed to induce polymerization, a photopolymerization initiator and a sensitizing agent are employed. Of these, a polymerizable compound containing a photopolymerization initiator is preferably polymerized and crosslinked with UV radiation. When employing a photopolymerization initiator, the quantity is preferably 0.1 mol % or more, more preferably 0.5 to 2 mol %, of the total quantity of polymerizable compounds. Employing such a composition suitably controls the polymerization reaction taking place via reactions producing active components. Examples of photopolymerization initiators are the Irgacure series commercially available from Ciba Specialty Chemicals (such as Irgacure 651, Irgacure 754, Irgacure 184, Irgacure 2959, Irgacure 907, Irgacure 369, Irgacure 379, and Irgacure 819); the Darocure series (such as Darocure TPO and Darocure 1173); Quantacure PDO; and the Ezacure series commercially available from Lamberti Corportion (such as Ezacure TZM and Ezacure TZT). These can be employed singly or in combinations of two or more.

In the polymerizable composition, in addition to the above components, it is possible to employ solvents, mold release agents, antifoaming agents, leveling agents, photostabilizing agents (such as hindered amines), oxidation inhibitors, polymerization inhibitors, antistatic agents, coloring agents (such as dyes and pigments), inorganic fillers, and organic fillers in combination.

Examples of solvents include 2-butanone, ethyl acetate, propylene glycol monomethyl ether, and propylene glycol monomethyl ether acetate.

The polymerizable composition can be obtained by uniformly mixing and dissolving the above components.

(Method of Forming the Organic Layer)

A layer of the polymerizable composition is normally formed by applying the polymerizable composition on a base such as a substrate film, inorganic barrier layer, or another device. Examples of application methods include the dip coating method, air knife coating method, curtain coating method, roller coating method, wire bar coating method, gravure coating method, slide coating method, and the extrusion coating method employing a hopper described in U.S. Pat. No. 2,681,294. Of these, a coating-based method is preferably employed.

The light that is irradiated is normally UV radiation from a high-pressure or low-pressure mercury lamp. The irradiation energy is preferably 0.1 $J/cm^2$ or higher, more preferably 0.5 $J/cm^2$ or higher. When a (meth)acrylate compound is employed as the polymerizable compound, the polymerization is impeded by oxygen in the air, it is thus preferable to reduce the oxygen concentration or oxygen partial pressure during polymerization. When reducing the oxygen concentration during polymerization by the nitrogen replacement method, the oxygen concentration is preferably 2% or lower, more preferably 0.5% or lower. When lowering the oxygen partial pressure during polymerization by reducing the pressure, the overall pressure is preferably 1,000 Pa or less, more preferably 100 Pa or less. It is particularly preferable to conduct UV radiation polymerization by irradiating an energy of 0.5 $J/cm^2$ or higher under reduced pressure conditions of 100 Pa or less.

The organic layer in the present invention is preferably smooth and consists of a hard film. The smoothness of the organic layer is preferably less than 1 nm and more preferably less than 0.5 nm as the average roughness (Ra value) of 1 μm square. The polymerization rate of the monomer is preferably 85% or higher, more preferably 88% or higher, further preferably 90% or higher, and particularly preferably, 92% or higher. The polymerization rate referred to here means the ratio of the polymerizable groups that have reacted among all the polymerizable groups (such as acryloyl groups and methacryloyl groups) in the monomer mixture. The polymerization rate can be quantified by the infrared radiation absorption method.

The thickness of the organic layer is not specifically limited. However, when excessively thin, it becomes difficult to achieve a film of uniform thickness. When excessively thick, cracks are generated by external forces, compromising the barrier property. From these perspectives, the thickness of the organic layer is preferably 50 to 2,000 nm, more preferably 200 to 1,500 nm.

The absence of foreign matter such as particles and protrusions on the surface of the organic layer is required. Thus, formation of the organic layer is preferably conducted in a clean room. The clean room is preferably of the 10,000 class or lower, more preferably of the 1,000 class or lower.

A hard organic layer is preferable. It has been found that, when the degree of hardness of the organic layer is high, the inorganic barrier layer forms smoothly, and as a result barrier properties can be enhanced. The hardness of the organic layer can be denoted as a microhardness by the nanoindentation method. The microhardness of the organic layer is preferably 100 N/mm or more, preferably 150 N/mm or more.

(The Inorganic Barrier Layer)

The inorganic barrier layer is normally a thin layer comprised of a metal oxide. Any method can be used to form the inorganic barrier layer so long as it permits the formation of the targeted thin film. Examples include physical vapor deposition methods (PVDs) such as the vapor deposition method, the sputtering method, and the ion plating method; various chemical vapor deposition methods (CVDs); and liquid phase deposition methods such as the plating and sol-gel methods. In the present invention, good barrier properties can be maintained even when fabrication is conducted by the sputtering method. The components contained in the inorganic barrier layer are not specifically limited other than that they satisfy the above performance requirements. For example, they can be metal oxides, metal nitrides, metal oxynitrides, or metal carbides. An oxide, nitride, carbide, oxynitride, or oxynitride carbide containing one or more metals selected from the group consisting of Si, Al, In, Sn, Zn, Ti, Cu, Ce, Ta, and the like is preferably employed. Of these, an oxide, nitride, or oxynitride of a metal selected from the group consisting of Si, Al, In, Sn, Zn, and Ti is preferable, and a metal oxide, nitride, or oxynitride of Si or Al is particularly preferable. These can contain other elements as secondary components. In the present invention, even when a metal oxide is employed as the material of the inorganic barrier layer and a film is formed by the plasma process, it is still possible to obtain a barrier laminate affording good barrier properties, which is highly significant. In the present invention, silicon nitride, silicon oxide, or a mixed oxide of nitrogenated silicon, silicon oxide, and silicon carbide is more preferable. The use of these inorganic materials improves the adhesion between the organic layer and the inorganic barrier layer. The use of silicon nitride is further preferable because it yields a dense film and a barrier laminate with high barrier properties.

The smoothness of the inorganic barrier layer formed by the present invention is preferably less than 1 nm, more preferably 0.5 nm or less, as the average roughness (Ra value) of a 1 μm square. Thus, the inorganic barrier layer is preferably formed in a clean room. The degree of cleanliness is preferably class 10,000 or lower, more preferably class 1,000 or lower.

The thickness of the inorganic barrier layer is not specifically limited. A single layer is usually 5 to 500 nm in thickness, preferably 20 to 200 nm. Two or more inorganic barrier layers can be a laminated. In the present invention, in a form in which the barrier laminate includes two or more inorganic barrier layers, adhesion between layers increases and the failure rate when employed in electronic devices decreases. When two or more layers are employed, each layer can be of the same composition or of a different composition. When two inorganic barrier layers or more are laminated, each of the inorganic barrier layers is preferably designed to fall within the preferable ranges set forth above. As disclosed in USP-A 2004-46497, it is also possible to incorporate a layer in which the interface with the organic layer is indistinct and the composition changes continuously in the direction of thickness.

(Lamination of the Organic Layer and Inorganic Barrier Layer)

The organic layer and the inorganic barrier layer can be laminated by sequentially and repeatedly forming films of the organic layer and the inorganic barrier layer based on a desired layer structure. When the inorganic barrier layer is formed by a vacuum film forming method such as sputtering, vacuum vapor deposition, ion plating, or plasma CVD, the organic layer is also preferably formed by a vacuum film forming method such as the flash vapor deposition method set forth above. In particular, when alternately laminating at least two organic layers and at least two inorganic barrier layers in the present invention, good barrier properties can be achieved. With a structure including two or more organic layers sandwiched between two inorganic barrier layers—such as a structure in which the sequence of adjacent layers is inorganic barrier layer, organic layer, inorganic barrier layer, organic layer, inorganic barrier layer—even better barrier properties can be achieved. In the present invention, it is preferable to provide an inorganic barrier layer on the surface of an organic layer derived from a polymerizable aromatic silane coupling agent to further improve adhesion between the organic layer and the inorganic barrier layer.

(Functional Layers)

The barrier laminate of the present invention can comprise functional layers on the barrier laminate or in other positions. Functional layers are described in detail in paragraphs 0036 to 0038 in Japanese Unexamined Patent Publication (KOKAI) No. 2006-289627. Examples of these additional functional layers include matting agent layers, protective layers, solvent-resistant layers, antistatic layers, leveling layers, adhesion-enhancing layers, light-blocking layers, antireflective layers, hardcoat layers, stress-relieving layers, antifogging layers, grime-preventing layers, printing layers, and adhesive layers.

(Applications of the Barrier Laminate)

The barrier laminate of the present invention is normally disposed on a support and can be employed in various applications through selection of the support. In addition to substrate films, examples of supports include various devices and optical elements. Specifically, the barrier laminate of the present invention can be employed as the barrier layer of a gas barrier film. The gas barrier film and barrier laminate of the present invention can also be employed to seal devices requiring a barrier property. The gas barrier film and barrier laminate of the present invention can also be applied to optical elements. These will be specifically described below.

<Gas Barrier Films>

Figure 3:
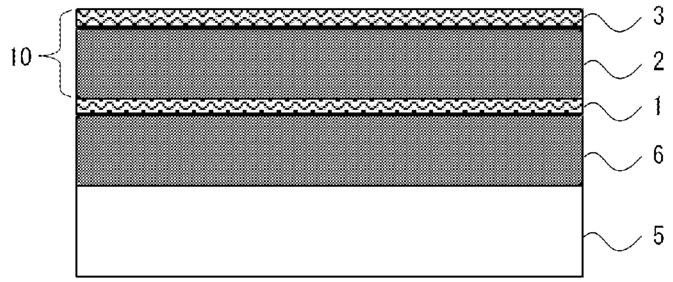
FIG. 3 is a schematic sectional view showing an example of the structure of the gas barrier film of the present invention.

A gas barrier film includes a substrate film and a barrier laminate formed over the substrate film. FIG. 3 shows an example of the configuration of the gas barrier film of the present invention in the form of a configuration in which an organic layer and an inorganic layer are disposed in alternating fashion on a substrate film 5. Specifically, moving sequentially from the substrate film 5 side, an organic layer 6, an inorganic layer 1, an organic layer 2, and an inorganic barrier layer 3 are disposed with mutually adjacent surfaces. Organic layer 6, also referred to as an undercoating layer, enhances adhesion between substrate film 5 and inorganic barrier layer 13. Organic layer 6 can be an organic layer containing the silane coupling agent denoted by general formula (1) above, or some other organic layer.

In a gas barrier film, the barrier laminate of the present invention can be provided on just one side or both sides of the substrate film. The barrier laminate of the present invention can be laminated in the order of inorganic barrier layer/organic layer from the substrate film side, or laminated in the order of organic layer/inorganic barrier layer. The top-most layer of the barrier laminate of the present invention can be either an inorganic barrier layer or an organic layer.

The gas barrier film can include structural components in addition to the barrier laminate and substrate film (such as a functional layer such as an adhesive layer). Functional layers can be disposed on the barrier laminate, between the barrier laminate and the substrate film, or on the side of the substrate film on which the barrier laminate is not provided (the reverse side).

(Plastic Films)

Normally, a plastic film is employed as the substrate film for the gas barrier film of the present invention. Any plastic film that is capable of supporting a barrier laminate such as an organic layer and an inorganic layer can be suitably selected based on the use objective or the like without specific limitation of material, thickness or the like. Specific examples of the plastic film include polyester resins, methacrylic resins, methacrylic acid-maleic acid copolymers, polystyrene resins, transparent fluororesins, polyimides, fluorinated polyimide resins, polyamide resins, polyamide-imide resins, polyetherimide resins, cellulose acylate resins, polyurethane resins, polyetheretherketone resins, polycarbonate resins, alicyclic polyolefin resins, polyarylate resins, polyethersulfonate resins, polysulfone resins, cycloolefin polymers, fluorene ring-modified polycarbonate resins, alicyclic modified polycarbonate resins, fluorene ring-modified polyester resins, acryloyl compounds, and other thermoplastic resins.

When employing the gas barrier film of the present invention as the substrate of a device such as an organic EL element, described further below, the plastic film is preferably comprised of a heat-resistant material. Specifically, it is preferably comprised of a highly heat-resistant, transparent material with a glass transition temperature (Tg) of 100° C. or higher and/or a coefficient of linear thermal expansion of 40 ppm/° C. or less. The Tg and coefficient of linear thermal expansion can be adjusted by means of additives and the like. Examples of such thermoplastic resins include: polyethylene naphthalate (PEN: 120° C.), polycarbonate (PC: 140° C.), alicyclic polyolefins (such as Zeonoa 1600: 160° C., manufactured by Zeon Corporation), polyarylate (PAr: 210° C.), polyether sulfone (PES: 220° C.), polysulfone (PSF: 190° C.), cycloolefin copolymer (COC, compound described in Japanese Unexamined Patent Publication (KOKAI) No. 2001-150584: 162° C.), polymide (such as Neoprim: 260° C., from Mitsubishi Gas Chemical Co.), fluorene ring-modified polycarbonate (BCF-PC, compound described in Japanese Unexamined Patent Publication (KOKAI) No. 2000-227603: 225° C.), alicyclic modified polycarbonate (IP-PC, compound described in Japanese Unexamined Patent Publication (KOKAI) No. 2000-227603: 205° C.), and acryloyl compounds (compound described in Japanese Unexamined Patent Publication (KOKAI) No. 2002-80616: 300° C. or higher) (temperature given in parentheses is Tg). In particular, it is preferable to employ alicyclic polyolefins and the like when transparency is desirable.

When the gas barrier film of the present invention is employed in combination with a polarizer, the barrier laminate of the gas barrier film is preferably oriented toward the interior of the cell and disposed in the innermost position (adjacent to the device). Since the gas barrier film will be positioned further inside the cell than the polarizer, the retardation value of the gas barrier film will become important. In such a configuration, preferable examples of the mode of use of the gas barrier film include: a lamination of a gas barrier film using a substrate film with a retardation value of 10 nm or less and a circular polarizer (¼ wavelength sheet+(½ wavelength sheet)+linear polarizer), or a use of a gas barrier film using a substrate film with a retardation value of 100 to 180 nm which can be used as a ¼ wavelength sheet, in combination with a linear polarizer.

Examples of substrate films with retardation values of 10 nm or less include cellulose triacetate (Fujifilm: Fujitac), polycarbonate (Teijin Chemical: Pureace; Kaneka: Elmec), cycloolefin polymers (JSR: Arton; Zeon Corp.: Zeona), cycloolefin polymers (Mitsui Chemical: Apel (pellets); Polyplastic: Topas (pellets)), polyarylate (Unitika: U100 (pellets)), and transparent polyimide (Mitsubishi Gas Chemical: Neoprim).

Films obtained by suitably stretching the above films to adjust the retardation value to a desired level can be employed as ¼ wavelength sheets.

The gas barrier film of the present invention can be employed in devices such as organic EL elements. Thus, the plastic film is preferably transparent. That is, the light transmittance thereof is normally 80% or more, preferably 85% or more, and more preferably, 90% or more. The light transmittance can be calculated by the method described in JIS-K7105. That is, an integrating sphere-type light transmittance measuring device can be employed to measure the total light transmittance and amount of scattered light, and the diffused transmittance is subtracted from the total light transmittance.

Even when the gas barrier film of the present invention is used in display applications, transparence is not necessarily required when the gas barrier film is not positioned on the observation side. Accordingly, in such cases, a non-transparent material can be employed as the plastic film. Examples of non-transparent materials include polyimides, polyacrylonitriles, and known liquid-crystal polymers.

The thickness of the plastic film employed in the gas barrier film of the present invention can be suitably selected based on the application, and is thus not specifically limited. However, it is conventionally 1 to 800 μm, preferably 10 to 200 μm. These plastic films may comprise functional layers such as transparent electrically conductive layers and primer layers. Functional layers are described in detail in paragraphs [0036] to [0038] in Japanese Unexamined Patent Publication (KOKAI) No. 2006-289627. Examples of additional functional layers are matting agent layers, protective layers, antistatic layers, smoothing layers, adhesion-enhancing layers, light-blocking layers, antireflective layers, hard-coat layers, stress-alleviating layers, anti-haze layers, anti-fouling layers, layers to be printed, and adhesive layers.

<The Device>

The barrier laminate and gas barrier film of the present invention are preferably employed in devices the functions of which deteriorate due to chemical components (oxygen, water, nitrogen oxides, sulfur oxides, ozone, and the like) in the air. Examples of such devices include organic EL elements, liquid-crystal display elements, thin-film transistors, touch panels, electronic paper, solar cells, and other electronic devices. The barrier laminate and gas barrier film of the present invention are preferably employed in organic EL elements.

The barrier laminate of the present invention can also be employed in the sealing of devices with films. This is a method in which the device itself functions as a support, and the barrier laminate of the present invention is provided on the surface thereof. The device can be covered with a protective layer prior to applying the barrier laminate.

The gas barrier film of the present invention can also be employed as a device substrate or as a film for sealing by the solid sealing method. The “solid sealing method” is a method of forming a protective layer on a device and then stacking and curing an adhesive layer and gas barrier film thereover. The adhesive is not specifically limited. Examples if the adhesive include thermosetting epoxy resins and photosetting acrylate resins.

When conventional barrier laminates and gas barrier films are incorporated into devices and, in that state, heated to a temperature of 80° C. or higher, they release alcohol gas and end up damaging the device. However, even when heated to temperatures of 80° C. or higher (80 to 200° C., for example), the barrier laminate and gas barrier film of the present invention do not release large quantities of alcohol gas, thereby effectively inhibiting device damage.

(Organic EL Elements)

An example of an organic EL element employing a gas barrier film is described in detail in Japanese Unexamined Patent Publication (KOKAI) No. 2007-30387. In the process of manufacturing an organic EL element, there are a drying step following the ITO etching step and other steps conducted under highly humid conditions. Thus, use of the gas barrier film of the present invention is extremely advantageous.

(Liquid-Crystal Display Elements)

A reflective type liquid-crystal display device has a configuration that is sequentially comprised of, from the bottom up, a substrate, reflective electrode, lower orientation film, liquid-crystal layer, upper orientation film, transparent electrode, upper substrate, λ/4 plate, and polarizing film. The gas barrier film of the present invention can be employed as the transparent electrode substrate and upper substrate. In the case of a color display, a color filter layer is further preferably disposed between the reflective electrode and lower orientation film, or between the upper orientation film and transparent electrode. A transparent liquid-crystal display device has a configuration that is sequentially comprised of, from the bottom up, a backlight, polarizer, λ/4 plate, lower transparent electrode, lower orientation layer, liquid-crystal layer, upper orientation layer, upper transparent electrode, upper substrate, λ/4 plate, and polarizing film. Therein, the substrate of the present invention can be employed as the upper transparent electrode and the upper substrate. In the case of a color display, a color filter layer is further preferably disposed between the lower transparent electrode and the lower orientation film, or between the upper orientation film and the transparent electrode. Although not specifically limited, the type of liquid-crystal cell is preferably of the TN (twisted nematic), STN (super twisted nematic), HAN (hybrid aligned nematic), VA (vertical alignment), ECB (electrically controlled birefringence), OCB (optically compensated bend), IPS (in-plane switching), or CPA (continuous pinwheel alignment) type.

(Solar Cells)

The barrier laminate and gas barrier film of the present invention can be employed as sealing films for solar cell elements. Here, sealing is preferably conducted such that the adhesive layer of the barrier laminate and gas barrier film of the present invention is on the side closest to the solar cell element. For solar cells, which are required to be able to withstand a certain degree of heat and humidity, the barrier laminate and gas barrier film of the present invention are suitable. Although not specifically limited, examples of the solar cell elements in which the barrier laminate and gas barrier film of the present invention are employed include single-crystal silicon solar panel elements, polycrystalline silicon solar cell elements, single-junction type and tandem-structure type amorphous silicon solar cell elements, gallium-arsenic (GaAs) and indium-phosphorus (InP) and other group III-V compound semiconductor solar cell elements, cadmium-telluride (CdTe) and other group II-VI compound semiconductor solar cell elements, copper/indium/selenium (so-called “CIS system”), copper/indium/gallium/selenium (so-called “CIGS system”), copper/indium/gallium/selenium/sulfur (so-called “CIGSS system”), and other group I-III-VI compound semiconductor solar cell elements, dye-sensitized type solar cell elements, and organic solar cell elements. Of these, the above solar cell element is preferably a copper/indium/selenium (so-called “CIS system”), copper/indium/gallium/selenium (so-called “CIGS system”), copper/indium/gallium/selenium/sulfur (so-called “CIGSS system”), or other group I-III-VI compound semiconductor solar cell element.

(Other)

Examples of other applications include the thin-film transistor described in Japanese Translated PCT Patent Application Publication (TOKUHYO) Heisei No. 10-512104; the touch panel described in publications such as Japanese Unexamined Patent Publication (KOKAI) Nos. Heisei 5-127822 and 2002-48913; the electronic paper described in Japanese Unexamined Patent Publication (KOKAI) No. 2000-98326; solar cell described in publications such as Japanese Unexamined Patent Publication (KOKAI) No. Heisei 9-18042.

Further, a resin film such as a polyethylene film or a polypropylene film can be laminated with the barrier laminate or gas barrier film of the present invention for use as a sealing bag. For details, reference can be made to the description given in Japanese Unexamined Patent Publication (KOKAI) Nos. 2005-247409 and 2005-335134.

<Optical Elements>

A circular polarizer is an example of an optical element employing the gas barrier film of the present invention.

(Circular Polarizers)

The gas barrier film of the present invention can be employed as a substrate and laminated with a λ/4 plate and a polarizer to fabricate a circular polarizer. In that case, the lamination is conducted so that the slow axis of the λ/4 plate forms an angle of 45° with the absorption axis of the polarizer. For such a polarizer, a polarizer formed by extension in a direction forming an angle of 45° with the longitudinal direction can be preferably employed. By way of example, the polarizer described in Japanese Unexamined Patent Publication (KOKAI) No. 2002-865554 can be preferably employed.

<A Polymerizable Composition Containing the Polymerizable Compound Denoted by General Formula (11)>

The polymerizable composition employed to fabricate the barrier laminate of the present invention preferably contains the polymerizable compound denoted by general formula (11) above. The polymerizable compound denoted by general formula (11) can also be preferably employed in the polymerizable composition that is employed in the fabrication of the organic layer of a laminate of common organic layer inorganic laminate form.

Unsaturated Group-Containing Compound (B)

The polymerizable composition containing the polymerizable compound denoted by general formula (11) above preferably contains an unsaturated group-containing compound (BB) in addition to the polymerizable compound component (AA) denoted by general formula (11). Examples of unsaturated group-containing compounds (BB) in addition to (AA) include reactive monomers and reactive oligomers. (Meth)acrylate reactive monomers and (meth) acrylate reactive oligomers are preferable.

Examples of the reactive monomers include: acryloyl morpholine, 2-hydroxypropyl (meth)acrylate, tetrahydrofluorofurfuryl (meth)acrylate, phenoxyethyl (meth)acrylate, 2-hydroxy-3-phenyloxypropl (meth)acrylate, isobornyl (meth)acrylate, tribromophenyl (meth)acrylate, o-phenylphenyloxyethyl (meth)acrylate, o-phenylphenyloxyethyloxyethyl (meth)acrylate, 2-hydroxy-3-(dibromophenyl)oxypropyl (meth)acrylate, dicyclopentanyl (meth)acrylate, bisphenol A polyethoxydi(meth)acrylate, tetrabromobisphenol A polyethoxydi(meth)acrylate, polyethyleneglycol di(methacrylate), 1,6-hexanediol di(meth)acrylate, 1,9-nonanediol di(meth)acrylate, pentaerythritol tri(meth)acrylate, other (meth)acrylate reactive monomers, and N-vinylcaprolactam.

Examples of reactive oligomers include epoxy(meth) acrylate reaction products of epoxy resin and (meth)acrylic acid; urethane (meth)acrylate reaction products of polyols, organic polyisocyanates, and hydroxyl group-containing (meth)acrylates; and other (meth)acrylate reactive oligomers.

Examples of epoxy resins employed to obtain epoxy (meth)acrylates include bisphenol A epoxy resin, bisphenol F epoxy resin, phenol novolac epoxy resin, terminal glycidyl ethers of propyleneoxide adducts of bisphenol A, and fluorene epoxy resins.

The reaction between an epoxy resin and (meth)acrylic acid is preferably conducted at a ratio of about 0.8 to 1.5 chemical equivalents, more preferably about 0.9 to 1.1 chemical equivalents, of the (meth)acrylic acid to one chemical equivalent of epoxy groups of the epoxy resin. The diluting agent preferably employed during the reaction is a photopolymerizable vinyl monomer such as 2-hydroxyethyle (meth)acrylate, 2-hydroxybutyl (meth)acrylate, trimethylolpropane tri(meth)acrylate, phenoxyethyloxyethyl (meth) acrylate, or dicyclopentanyl (meth)acrylate. A catalyst for promoting the reaction (such as benzyldimethylamine, triethylamine, benzyltrimethyl ammonium chloride, benzyltriethyl ammonium bromide, triphenylphosphine, and triphenylstibine) is also preferably employed. The quantity of catalyst employed is preferably 0.1 to 10 weight %, more preferably 0.3 to 5 weight %, of the reaction mixture. A polymerization inhibitor for preventing polymerization during the reaction (such as methoquinone, hydroquinone, or phenothiazine) is preferably employed. The quantity employed is preferably 0.01 to 1 weight %, more preferably 0.05 to 0.5 weight %, of the reaction mixture. The reaction temperature is preferably 60 to 150° C., more preferably 80 to 120° C.

Examples of polyols employed to obtain urethane (meth) acrylates include ethylene glycol, 1,4-butanediol, neopentyl glycol, polycaprolactone polyol, polyester polyol, polytetramethylene glycol, bisphenol A polyethoxydiol, and the like.

Examples of organic polyisocyanates employed to obtain urethane (meth)acrylates include hexamethylene diisocyanate, isophorone diisocyanate, tolylene diisocyanate, xylylene diisocyanate, 4,4'-diphenylmethane diisocyanate and the like.

Examples of hydroxyl group-containing (meth)acrylates include 2-hydroxyethyl (meth)acrylate, 2-hydroxypropyl (meth)acrylate, 1,4-butanediol mono(meth)acrylate, ϵ-caprolactone adducts of 2-hydroxyethyl (meth)acrylate, pentaerythritol tri(meth)acrylate and the like.

The above urethane (meth)acrylates can be obtained by reacting 1.1 to 2.0 chemical equivalents of the isocyanate group of an organic polyisocyanate per chemical equivalent of hydroxyl groups of polyol, preferably at a reaction temperature of 70 to 90° C., to synthesize a urethane oligomer, and then reacting 1 to 1.5 chemical equivalents of the hydroxyl groups of a hydroxyl group-containing ethylenic unsaturated compound per chemical equivalent of the isocyanate groups of the urethane oligomer, preferably at a reaction temperature of 70 to 90° C.

It is also preferable that the unsaturated group-containing compound (BB) is a silane coupling agent. A (meth)acrylate monomer containing a silane coupling group is preferable as the silane coupling agent. Preferable specific examples of phosphoric acid monomers and silane coupling group-containing monomers are given below. However, compounds that can be employed in the present invention are not limited thereto.

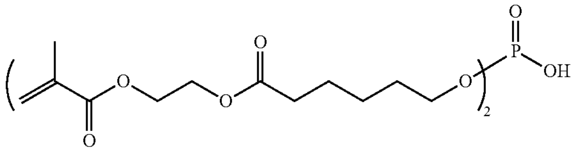

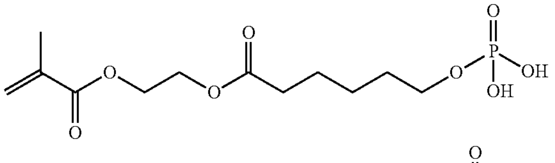

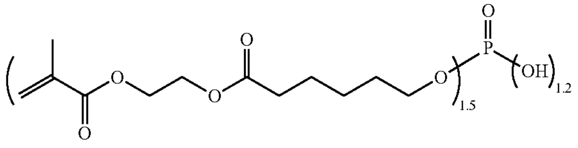

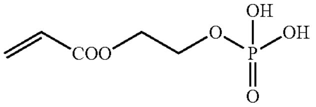

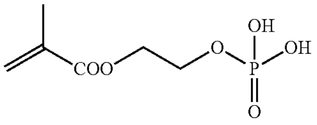

-continued

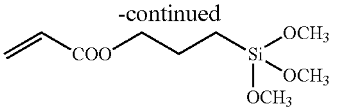

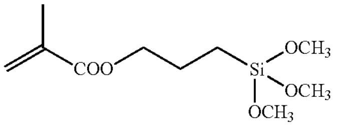

Photopolymerization Initiators (CC)

When the polymerizable composition containing the polymerizable compound denoted by general formula (11) is cured by irradiation with UV radiation, a photopolymerization initiator (CC) is preferably employed. Examples of photopolymerization initiator (CC) include the photopolymerization initiators given by way of example above.

The use ratios of the various components employed in the polymerization composition containing the polymerizable compound denoted by general formula (11) are, based on all components excluding solvent, preferably 5 to 95 weight %, more preferably 20 to 90 weight %, for polymerizable compound (AA), preferably 0 to 95 weight %, more preferably 5 to 90 weight %, and further preferably 10 to 80 weight % for unsaturated group-containing compound (BB), and preferably 0 to 15 weight parts, more preferably 0 to 7 weight parts for photopolymerization agent (CC) when the total quantities of (A) and (B) are adopted as 100 weight parts.

The polymerization rate of the polymerizable composition containing the polymerizable compound denoted by general formula (11) is preferably 85% or more, more preferably 88% or more, still more preferably 90% or more, and further preferably, 92% or more. The polymerization rate referred to here means the ratio of reacted polymerizable groups among all the polymerizable groups (such as acryloyl groups and methacryloyl groups) in the polymerizable composition. The polymerization rate can be quantified by the infrared radiation absorption method.

The refractive index of the organic layer formed of the polymerizable composition containing the polymerizable compound denoted by general formula (11) is preferably 1.56 to 1.78, more preferably 1.57 to 1.77.

The polymerizable composition containing the polymerizable compound denoted by general formula (11) is useful for barrier laminates. It is also useful for lenses such as Fresnel lenses, lenticular lenses, other transmission screen-use and TFT-use prism lens sheets, and eyeglass lenses; various coating agents; casting agents; adhesives; print inks; and the like.

EXAMPLES

The present invention will be described in greater detail below through examples. The materials, quantities used, ratios, processing contents, processing procedures, and the like that are set forth in the examples below can be suitably modified without departing from the spirit or scope of the present invention. Thus, the scope of the present invention is not limited to the specific examples given below.

Reference Example 1

(Preparation of starting material epoxy compound) A 225.0 g quantity of 4,4'-(1,3-phenylenebis(2,2-propylidene)) bisphenol was dissolved in epichlorohydrin (241.0 g) and the mixture was stirred for 6 hours at 60° C. In this process, a total of 4.4 g of 48% sodium hydroxide aqueous solution was added dropwise in two installments, once at the start of the reaction and once at two hours into the reaction. Subsequently, 48% sodium hydroxide aqueous solution (4.4 g) was added over two hours under reduced pressure. At the same time, water that had been added to the reaction system and water generated by the reaction system was removed.

When the reaction had ended, the excess epichlorohydrin was removed, toluene was added to the resinous product obtained, and the sodium chloride generated was removed by washing with water. Next, 10% sodium hydroxide aqueous solution (6.4 g) and benzyltriethyl ammonium chloride (0.4 mL) were added and the mixture was stirred for 90 minutes at 80° C. The mixture was allowed to settle and separate, and the aqueous layer was removed. Subsequently, the toluene was concentrated and removed, yielding 113.8 g of reaction product comprised chiefly of 4,4'-(1,3-phenylenebi(2,2-propylidene))bis(phenyleneoxymethyleneoxirane) as a starting material epoxy compound.

Synthesis Example 1

Preparation of α,α'-bis[4-(3-acryloxy-2-hydroxypropoxy)phenyl]-α,α,α',α'-tetramethyl-m-xylene To a three-necked flask with a capacity of 300 mL equipped with stirring vanes, temperature gage, reflux condenser with calcium chloride tube on the front end, and capillaries for blowing in air were charged the bisphenol compound (epoxy equivalent 248) comprised chiefly of 4,4'-[1,3-phenylenebis(2,2-propylidene)]bis(phenyleneoxymethyleneoxirane) obtained in Reference Example 1 (37.2 g), acrylic acid (12.96 g), tetra-n-butylammonium bromide (2.42 g), hydroquinone monomethyl ether (0.025 g), 2,6-di-tert-butyl-4-methylphenol (0.025 g), and toluene (150 g). The mixture was then stirred while blowing in air, heated, and reacted for 8 hours under reflux to obtain EA-1-A.

When the reaction had ended, the acid value of the reaction mixture (solution) obtained was 8.0 mgKOH/g. The reaction mixture EA-1-A was cooled to room temperature, diluted by adding ethyl acetate (250 mL), and washed twice with 5% sodium bicarbonate aqueous solution (100 mL) and twice with water (100 mL). The organic layer was the separated, dried with sodium sulfate anhydride and then filtered. The solvent was distilled out under reduced pressure from the filtrate obtained, yielding the targeted epoxy acrylate compound (EA-1-B) (47.5 g) (yield 99%) in the form of a viscous pale yellow liquid.

The epoxy acrylate compound showed the viscosity at 40° C. of 39,500 mPa·s, refractive index at 25° C. of 1.562, and the 10% weight loss temperature by TG/DSC (differential scanning calorimetry) in a nitrogen gas flow of 387° C.

(EA-1-B)

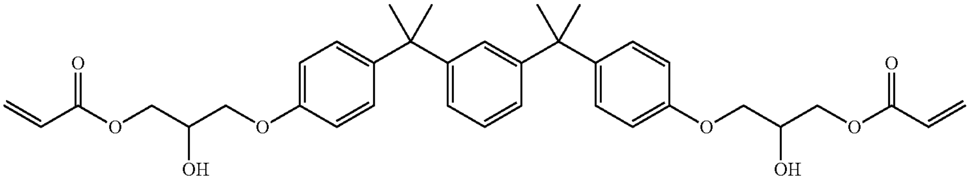

Reference Example 2

Preparation of Starting Material Epoxy Compound

A 294.5 g quantity of 4,4'-(1-methylethylidene)bis(2-cyclohexylphenol) was dissolved in epichlorohydrin (695.0 g). Water (1.3 g) was then added and the mixture was stirred for 5 hours at 60° C. In this process, a total of 12.4 g of 48% sodium hydroxide aqueous solution was added dropwise in two installments, once at the start of the reaction and once at two hours into the reaction. Subsequently, 48% sodium hydroxide aqueous solution (130.0) was added over two hours under reduced pressure. At the same time, water that had been added to the reaction system and water generated by the reaction system was removed.

When the reaction had ended, the excess epichlorohydrin was removed. Methyl isobutyl ketone was added to the resin layer obtained and the sodium chloride produced was removed by washing with water. Next, 10% sodium hydroxide aqueous solution (229.5 g) and benzyl triethyl ammonium chloride (0.5 mL) were added, the mixture was stirred for 90 minutes at 80° C., the mixture was allowed to settle and separate, and the aqueous layer was removed.

To the methyl isobutyl ketone solution of resin obtained was added 5% sodium dihydrogen phosphate aqueous solution, the mixture was stirred for 30 minutes at 80° C. for neutralization, the mixture was allowed to settle and separate, and the aqueous layer was removed. Subsequently, the methyl isobutyl ketone was concentrated and removed, yielding 308.0 g of reaction product comprised chiefly of 4,4'-(1-methylethylidene)bis(2-cyclohexylphenyleneoxymethyleneoxirane) as a starting material epoxy compound.

Synthesis Example 2

To a four-necked flask with a capacity of 500 mL equipped with stirring vanes, temperature gage, reflux condenser with calcium chloride tube on the front end, and capillaries for bowing in air, were charged the 4,4'-(1-methylethylidene)bis(2-cyclohexylphenyleneoxymethyleneoxirane) (63.4 g) obtained in Reference Example 2, acrylic acid (20.73 g), tetrabutyl ammonium bromide (3.87 g), hydroxyquinone monomethyl ether (0.042 g), 2,6-di-tert-butyl-4-methylphenol (0.042 g), and toluene (240 g). The mixture was then stirred while blowing in air, heated, and reacted for 8 hours under reflux to obtain EA-2-A.

When the reaction had ended, the acid value of the reaction mixture (solution) obtained was 7.7 mgKOH/g. The reaction mixture was cooled to room temperature, diluted by adding 400 mL of ethyl acetate, and washed once with 120 mL of 2% sodium hydroxide aqueous solution and twice with 120 mL of water. The organic layer was separated, dried with sodium sulfate anhydride, and then filtered. The solvent was distilled out under reduced pressure from the filtrate obtained, yielding the targeted epoxy acrylate compound (EA-2-B) (80 g) in the form of a viscous pale yellow liquid. The yield was 99% or higher.

Reference Example 3

Preparation of Starting Material Epoxy Compound

To a four-necked flask with one-liter capacity equipped with temperature gage, dropping funnel, cooling tube, and stirrer were charged and dissolved, under a nitrogen flow, 2,2',3,5',6,6'-hexamethylbiphenol (67.5 g), epichlorohydrin (462.5 g), and dimethyl sulfoxide (170 g). The solution was heated to 55° C. Sodium hydroxide flakes (20 g) were added in increments over 100 minutes. The mixture was then reacted for 2 hours at 55° C. and for 30 minutes at 70° C. When the reaction had ended, a rotary evaporator was employed to distill off the excess epichlorohydrin and dimethyl sulfoxide under reduced pressure with heating to 130° C. Methyl isobutyl ketone (96 g) was then added and the residue was dissolved.

The methyl isobutyl ketone solution obtained above was heated to 70° C., 5 g of 30% sodium hydroxide aqueous solution was added to the solution, and the mixture was reacted for one hour. Following the reaction, the reaction solution was repeatedly washed with pure water until the washed solution assumed a neutral pH. The aqueous layer was removed by phase separation. A rotary evaporator was employed to distill off the methyl isobutyl ketone from the organic layer under reduced pressure with heating, yielding an epoxy compound (86 g).

Synthesis Example 3

The epoxy compound (86 g) obtained above and acrylic acid (32.5 g) were dissolved at 60° C. (epoxy compound: acrylic acid=0.5:1 molar ratio). A solvent in the form of triethyl benzyl chloride (1.7 g) and a polymerization inhibitor in the form of hydroquinone (0.05 g) were then added. The mixture was heated to 90 to 95° C. and reacted with stirring. During the reaction, the acid value and the epoxy equivalent were measured. When the acid value dropped to 2.0 mgKOH/g, the reaction was stopped, at which time the reaction had been conducted for 14 hours, yielding epoxy acrylate compound (EA-3-A) at a yield of 98%. The targeted compound obtained was a viscous liquid at 60° C.

The reaction mixture was cooled to room temperature, diluted by the addition of 250 mL of ethyl acetate, washed once with 100 mL of a 2% sodium hydroxide aqueous solution, and washed twice with 100 mL of water. The organic layer was separated out, dried with sodium sulfate anhydride, and filtered. The solvent was distilled out under reduced pressure from the filtrate obtained, yielding the (EA-2-B)

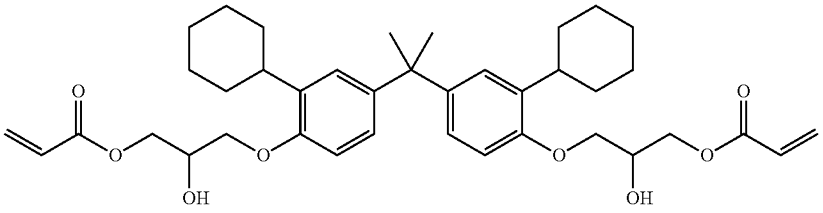

targeted epoxy acrylate compound (EA-3-B) (50 g) in the form of a viscous, pale yellow liquid. The yield was 99% or her.

(EA-3-B)

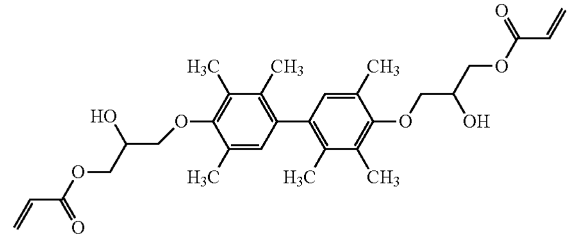

Synthesis Example 4

Polymerizable Compound (EA-4-B, A-1) Denoted by General Formula (11)

A 4.25 g quantity of 4,4'-[1-[4-[1-(4-hydroxyphenyl)-1-methylethyl]phenyl]ethylidene]bisphenol, triethylamine (3.34 g), and tetrahydrofuran (7 g) were charged and the mixture was cooled to 0° C. Subsequently, acrylic acid chloride (2.99 g) was added dropwise to the mixture and the mixture was stirred for 1 hour at a reaction temperature of 0° C. and then stirred for 3 hours at 25° C. The reaction mixture was diluted by adding ethyl acetate (50 mL), washed twice with water (50 mL), washed once with saturated sodium bicarbonate aqueous solution (80 mL), washed once with water (50 mL), and washed once with saturated brine. The organic layer was separated out, dried with magnesium sulfate anhydride, and filtered. The solvent was distilled out under reduced pressure from the filtrate obtained, yielding the targeted polymerizable compound (EA-4-B, A-1) (72.1 g) in the form of an ethyl acetate solution. The $^{1}$H-NMR measurement results of the product are given below.

$^{1}$H-NMR data

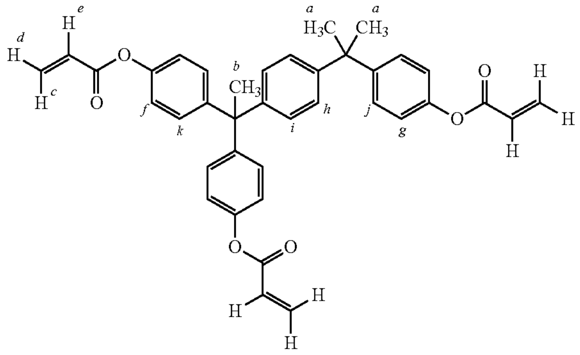 [SMILES: C=CC(=O)Oc1ccc(C(C)(C)c2ccc(C(C)(c3ccc(OC(=O)C=C)cc3)c3ccc(OC(=O)C=C)cc3)cc2)cc1]

| δ (ppm) | Signal form | Proton no. | Assignment. |
|---|---|---|---|
| 1.68 | s | 6 | a |
| 2.18 | s | 3 | b |
| 5.98-6.01 | m | 3 | c |
| 6.27-6.34 | m | 3 | d |
| 6.56-6.61 | m | 3 | e |
| 6.97-7.04 | m | 10 | f, g, h, l |
| 7.09-7.13 | m | 6 | j,k |

Synthesis Example 5

A mixture of bisphenol A diglycidyl ether (96.5 g) (epoxy equivalent 170.2) and di-tert-butyl-p-cresol (DBPC) (0.13 g) was heated to 95° C. and stirred. A gas introducing frit was used to saturate the mixture with air. $Cr^{III}$ isooctanoate (Hexcem) (0.258 g) dissolved in acrylic acid (7.4 mL) was then added dropwise over 22 minutes to the mixture. The remaining acrylic acid (21.3 mL, total 87.3 g, 95 equivalent %) was weighed out and added over 40 minutes. Stirring was conducted for 5 hours at 100° C., after which the mixture was cooled to room temperature, yielding a uniform, transparent, slightly green liquid (EA-5-A) containing the targeted epoxy acrylate compound.

The reaction mixture was cooled to room temperature, diluted by the addition of ethyl acetate (500 mL), washed once with 150 mL of a 2% sodium hydroxide aqueous solution, and washed twice with 150 mL of water. The organic layer was separated out, dried with sodium sulfate anhydride, and filtered. The solvent was distilled out under reduced pressure from the filtrate obtained, yielding the targeted epoxy acrylate compound (EA-5-B) (140 g) in the form of a viscous, pale yellow liquid. The yield was 99% or higher.

(EA-5-B)

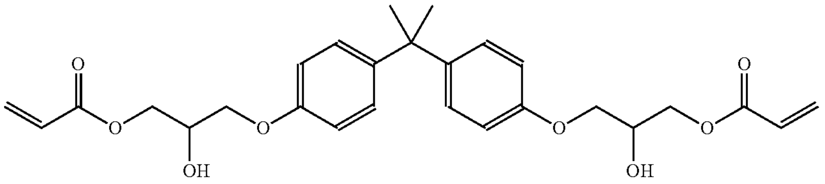

Synthesis Example 6

Polymerizable Compound (A-2) Denoted by General Formula (11)

A 4.25 g quantity of 4,4'-[1-[4-[1-(4-hydroxyphenyl)-1-methylethyl]phenyl]ethylidene]bisphenol, glycidyl methacrylate (4.71 g), tetrabutyl ammonium bromide (0.18 g), and 2-butanone (8.96 g) were charged and the mixture was stirred for 8 hours at a reaction temperature of 80° C. The reaction mixture was cooled to room temperature, diluted by the addition of ethyl acetate (50 mL), washed twice with a saturated sodium bicarbonate aqueous solution (50 mL), washed once with water (50 mL), and washed once with saturated brine. The organic layer was separated out, dried with magnesium sulfate anhydride, and filtered. The solvent was distilled out under reduced pressure from the filtrate obtained, yielding the targeted polymerizable compound (A-2) (72.1 g) in the form of an ethyl acetate solution. The $^1$H-NMR measurement results for the product are given below.

$^1$H-NMR data

Synthesis Example 7

Polymerizable Compound (A-3) Denoted by General Formula (11)

A 4.25 quantity of 4,4'-[1-[4-[1-(4-hydroxyphenyl)-1-methylethyl]phenyl]ethylidene]bisphenol, 2-isocyanatoethyl acrylate (4.65 g), 2-butanone (8.96 g), octanoic acid bismuth salt (0.040 g) (Neostan U-600, manufactured by To a Kasei (Ltd.)) were charged and the mixture was stirred for 8 hours at a reaction temperature of 80° C. The reaction mixture was cooled to room temperature, diluted by the addition of ethyl acetate (50 mL), washed twice with a saturated sodium bicarbonate aqueous solution (50 mL), washed once with water (50 mL), and washed once with saturated brine. The organic layer was separated out, dried with magnesium sulfate anhydride, and filtered. The solvent was distilled out under reduced pressure from the filtrate obtained, yielding the targeted polymerizable compound (A-3) (72.1 g) in the form of an ethyl acetate solution. The $^1$H-NMR measurement results for the product are given below.

$^1$H-NMR data

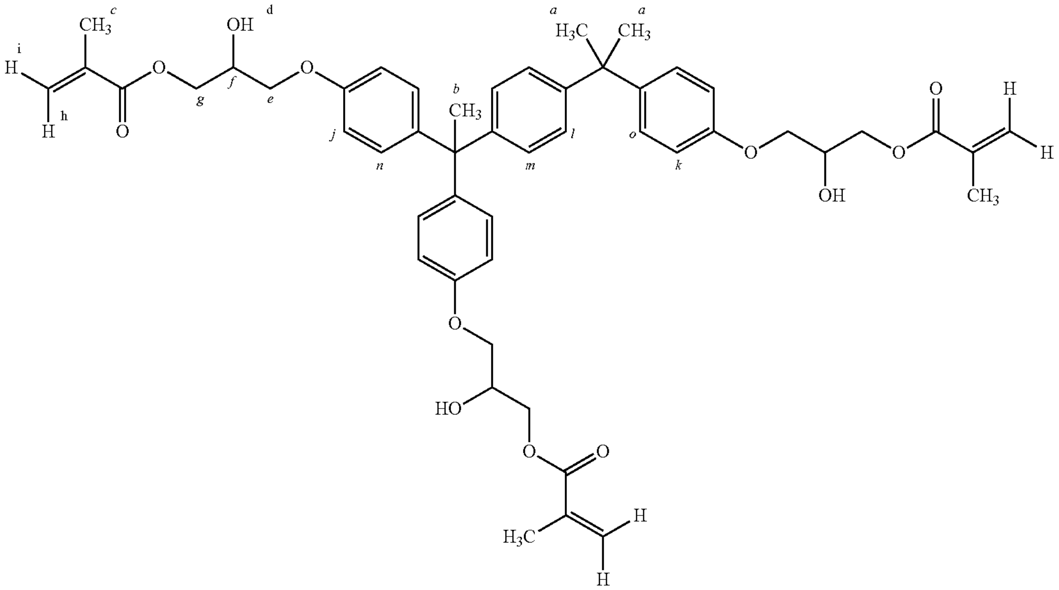 [SMILES: C=C(C)C(=O)OCC(O)COc1ccc(C(C)(C)c2ccc(C(C)(c3ccc(OCC(O)COC(=O)C(=C)C)cc3)c3ccc(OCC(O)COC(=O)C(=C)C)cc3)cc2)cc1]

| δ(ppm) | Signal form | Proton no. | Assignment |
|---|---|---|---|
| 1.62 | s | 9 | a |
| 1.92 | m | 9 | b |
| 2.18 | s | 3 | c |
| 2.77 | br | 3 | d |
| 3.92-4.43 | m | 15 | e, f, g |
| 5.6 | m | 3 | h |
| 6.15 | m | 3 | i |
| 6.70-7.12 | m | 16 | j, k, l, m, n, o |

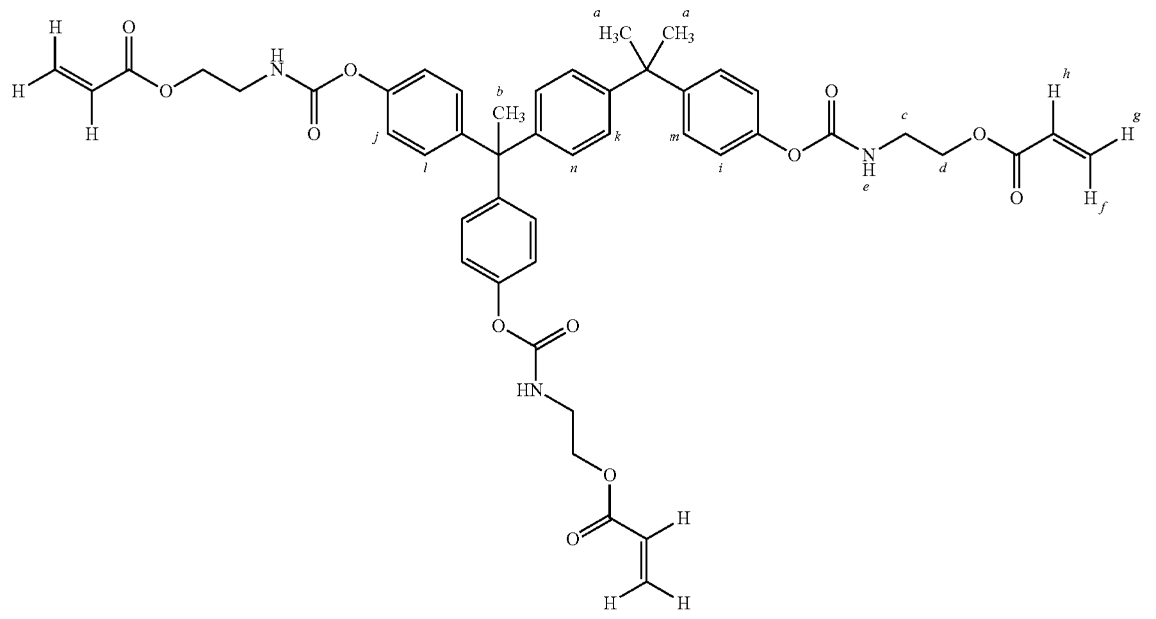 [SMILES: C=CC(=O)OCCNC(=O)Oc1ccc(C(C)(C)c2ccc(C(C)(c3ccc(OC(=O)NCCOC(=O)C=C)cc3)c3ccc(OC(=O)NCCOC(=O)C=C)cc3)cc2)cc1]

| δ(ppm) | Signal form | Proton no. | Assignment |
|---|---|---|---|
| 1.62 | s | 6 | a |
| 2.12 | s | 3 | b |
| 3.48-3.61 | m | 6 | c |
| 4.31 | t | 6 | d |
| 5.36 | m | 3 | e |
| 5.89 | d | 3 | f |
| 6.15 | q | 3 | g |
| 6.46 | d | 3 | h |
| 6.90-7.12 | m | 14 | i, j, k, l, m |
| 7.22 | d | 2 | n |

Reference Example 4

Preparation of Starting Material Epoxy Compound

A 196.3 g quantity of 1,1,2,2-tetrakis(4-hydroxyphenyl) ethane was dissolved in epichlorohydrin (241.0 g) and the mixture was stirred for 6 minutes at 60° C. In this process, a total of 4.4 g of 48% sodium hydroxide aqueous solution divided in two installments were added dropwise at the start of the reaction and two hours into the reaction. Subsequently, a 48% sodium hydroxide aqueous solution (4.4 g) was added dropwise under reduced pressure over 2 hours. Simultaneously, water that had been added to the reaction system and water produced by the reaction system were removed.

When the reaction had ended, the excess epichlorohydrin was removed. Toluene was added to the resinous product obtained and the sodium chloride that was produced was removed by washing with water. A 10% sodium hydroxide aqueous solution (6.4 g) and benzyltriethyl ammonium chloride (0.4 mL) were added, the mixture was stirred for 90 minutes at 80° C., settled and separated, and the aqueous layer was removed. To the toluene solution of resin obtained was added a 5% sodium dihydrogen phosphate aqueous solution. The mixture was stirred for 30 minutes at 80° C. to achieve neutralization. The mixture was settled and separated, and the aqueous layer was removed. Subsequently, the toluene was concentrated and removed, yielding 99.3 g of reaction product containing chiefly of 1,1,2,2-tetrakis[4-oxymethyleneoxysilane]phenyl]ethane as a starting material epoxy compound.

Synthesis Example 8

Preparation of 1,1,2,2-tetrakis[4-(3-acryloxy-2-hydroxypropoxy)phenyl]ethane

To a three-necked flask with a capacity of 300 mL equipped with stirring vanes, temperature gage, reflux condenser with calcium chloride tube on the front end, and capillaries for blowing in air, were charged the compound (epoxy equivalent 155.7) (28.0 g) comprised chiefly of 1,1,2,2-tetrakis[4-oxymethyleneoxysilane]phenyl]ethane obtained in Reference Example 4; acrylic acid (12.96 g); tetra-n-butylammonium bromide (2.42 g); hydroquinone monomethyl ether (0.025 g); 2,6-di-tert-butyl-4-methylphenol (0.025 g); and toluene (150 g). The mixture was then stirred while blowing in air, heated, and reacted for 8 hours under reflux to obtain EA-6-A.

When the reaction had ended, the acid value of the reaction mixture (solution) obtained was 6.0 mgKOH/g. The reaction mixture EA-6-A was cooled to room temperature, diluted by adding ethyl acetate (250 mL), and washed twice with 5% sodium bicarbonate aqueous solution (100 mL) and twice with water (100 mL). The organic layer was separated, dried with sodium sulfate anhydride and then filtered. The solvent was distilled out under reduced pressure from the filtrate obtained, yielding the targeted epoxy acrylate compound (EA-6-B) (40.9 g) (yield 99%) in the form of a viscous pale yellow liquid.

(EA-6-B)

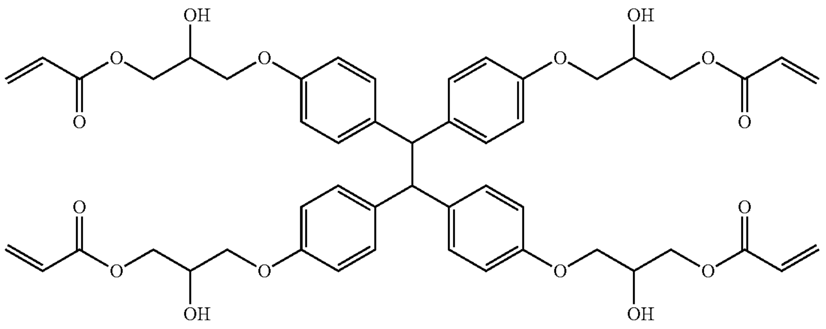

Synthesis Example 9

A 3.21 g quantity of 2,6-bis-(4-hydroxybenzyl)-4-methylphenol, triethylamine (3.34 g), and tetrahydrofuran (7 g) were charged and cooled to 0° C. Subsequently, acrylic acid chloride (2.99 g) was added dropwise, the mixture was stirred for 1 hour at a reaction temperature of 0° C., and stirring was conducted for 3 hours at 25° C. The reaction mixture was diluted by adding ethyl acetate (50 mL), washed twice with water (50 mL), washed once with a saturated sodium bicarbonate aqueous solution (80 mL), washed once with water (50 mL), and washed once with saturated brine. The organic layer was separated, dried with magnesium sulfate anhydride, and filtered. The solvent was distilled out under reduced pressure from the filtrate, yielding the targeted polymerizable compound (EA-7-B) (54.4 g) in the form of an ethyl acetate solution.

(EA-7-B)

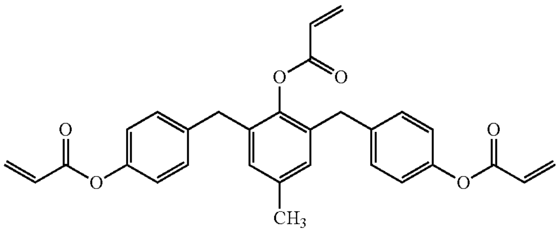

Example 1

Preparation of Organic Layer Coating Liquid

An organic layer coating liquid comprised of polymerizable compound (EA-1-B) (7 weight parts), a silane coupling agent (KBM-5130, manufactured by Shin-Etsu Chemical Co., Ltd.) (1 weight part), a polymerization initiator (0.16 weight % relative to total solid fraction of organic layer coating liquid), and methyl ethyl ketone (MEK) (32 weight parts) was prepared.

Fabrication of Gas Barrier Film

The organic layer coating liquid prepared above was adjusted to yield a dry film thickness of 1,000 nm with methyl ethyl ketone and used to form a film on a polyethylene terephthalate film (Teonex Q65FA, manufactured by Teijin-DuPont, 100 μm in thickness). The film was cured by irradiation with UV radiation at an irradiation level of 0.5 $J/cm^2$ under a 100 ppm nitrogen atmosphere to prepare an organic layer. An SiN film was formed by plasma CVD to 40 nm in thickness on the surface of the organic layer. An identical organic layer, inorganic barrier layer, and organic layer were further laminated to fabricate a barrier film.

Silane Coupling Agent (KBM-5130)

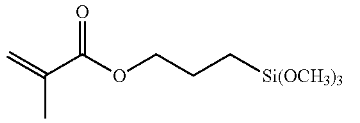

The amount of uncured component in the organic layer, water vapor permeability, adhesion, and heat resistance of the gas barrier film obtained were evaluated by the following methods.

[Quantification of Uncured Component in Organic Layer]

The organic layer coating liquid adjusted as set forth above was adjusted with methyl ethyl ketone to yield a dry film thickness of 1,000 nm and used to form a film on a glass substrate 10×10 cm in size. The film was cured by irradiation with a UV radiation level of 0.5 $J/cm^2$ under a 100 ppm nitrogen atmosphere. The glass substrate with the organic layer obtained was immersed in a petri dish containing 50 mL of methyl ethyl ketone, where it was left for 1 hour. The methyl ethyl ketone was then removed and distilled off at 50° C. The weight of the remaining impurities was determined. The results are given in the following table in units of weight %.

[Barrier Properties]

The water vapor permeability ($g/m^2$/day) was measured by the method described by G. Nisato, P. C. P. Bouten, P. J. Slikkerveer, et al., SID Conference Record of the International Display Research Conference, pp. 1435-1438. The temperature employed was 40° C. and the relative humidity was 90%. The results are given in the table below.

[Film Properties of Inorganic Layer]

The permeabilities of the gas barrier films fabricated were visually evaluated. No clouding was evaluated as ○ (Good) and the presence of clouding as X (Poor). The results are given in the table below.

[Adhesion Test]

A cross-cut test was conducted in accordance with JIS K5400 to evaluate the adhesion of the gas barrier film. The surface of gas barrier films having the layer configuration set forth above were scarred in two directions offset by 90° at a spacing of 1 mm with cutter knives to create 100 squares at a 1 mm spacing. Mylar tape [Polyester Tape No. 31 B, manufactured by Nitto Denko] 2 cm in width was then adhered thereover. A tape removing tester was then employed to remove the applied tape. The number of squares (n) that remained without separating from the group of 100 on the laminate film was counted. The results are given as percentages.

[Heat Resistance Test]

The gas barrier films were placed in a 200° C. thermostatic chamber and kept there for 1 hour to evaluate the heat resistance properties of the gas barrier films. A 10 cm square (the area within a square measuring 10 cm on a side) was observed and the presence or absence of portions that had swollen due to the generation of gas in the organic layer sandwiched between inorganic barrier layers was evaluated. The absence of swollen portions was denoted as ○ (Good) and the presence of swollen portions as X (Poor).

Examples 2 to 7

With the exception that EA-1-B in Example 1 was changed to the compounds indicated in Table 1 below, the barrier properties and adhesion tests were conducted by the same methods as in Example 1. The results are given in Table 1 below.

Example 8

A 60 mL quantity of ethyl acetate was used to dilute 15 g of an epoxy acrylate in the form of NK oligo EA-6320 (manufactured by Shin-Nakamura Chemical Co., Ltd.) and the mixture was washed twice with 60 mL of a saturated sodium bicarbonate aqueous solution. The organic layer was separated, dried with magnesium sulfate anhydride, and filtered. The solvent was distilled out under reduced pressure from the filtrate obtained, yielding 100 g of the targeted epoxy acrylate compound (EA-8-B) in the form of a viscous pale yellow liquid. The yield was 99% or more.

Comparative Examples 1 to 7

With the exception that EA-1-B in Example 1 was changed to the compounds indicated in Table 1 below, the barrier properties and adhesion tests were conducted by the same methods as in Example 1. The results are given in Table 1 below.

TABLE 1

| | Polymerizable compound | Barrier property | Inorganic layer film formation | Adhesion | Heat resistance | Qty. of uncured compound |
|---|---|---|---|---|---|---|
| Example 1 | EA-1-B | $4 \times 10^{-4}$ | Good | 100 | Good | 1.2 |
| Example 2 | EA-2-B | $5 \times 10^{-4}$ | Good | 100 | Good | 1.2 |
| Example 3 | EA-3-B | $9 \times 10^{-4}$ | Good | 100 | Good | 1.1 |
| Example 4 | EA-4-B | $1 \times 10^{-4}$ | Good | 100 | Good | 1.0 |
| Example 5 | EA-5-B | $5 \times 10^{-4}$ | Good | 100 | Good | 1.2 |
| Example 6 | EA-6-B | $8 \times 10^{-4}$ | Good | 100 | Good | 1.1 |
| Example 7 | EA-7-B | $1 \times 10^{-4}$ | Good | 100 | Good | 1.0 |
| Example 8 | EA-8-B | $4 \times 10^{-4}$ | Good | 100 | Good | 1.2 |
| Comparative Example 1 | EA-1-A | $5 \times 10^{-3}$ | Good | 100 | Poor | 3.3 |
| Comparative Example 2 | EA-2-A | $6 \times 10^{-3}$ | Good | 100 | Poor | 3.4 |
| Comparative Example 3 | EA-3-A | $9 \times 10^{-3}$ | Good | 100 | Poor | 3.2 |

TABLE 1-continued

| | Polymerizable compound | Barrier property | Inorganic layer film formation | Adhesion | Heat resistance | Qty. of uncured compound |
|---|---|---|---|---|---|---|
| Comparative Example 4 | EA-5-A | $8 \times 10^{-3}$ | Good | 100 | Poor | 3.2 |
| Comparative Example 5 | EA-6-A | $2 \times 10^{-3}$ | Good | 100 | Poor | 3.1 |
| Comparative Example 6 | EA-6320 | $4 \times 10^{-3}$ | Good | 100 | Poor | 3.3 |
| Comparative Example 7 | TMPTA | $8 \times 10^{-3}$ | Poor | 80 | Poor | 1.0 |

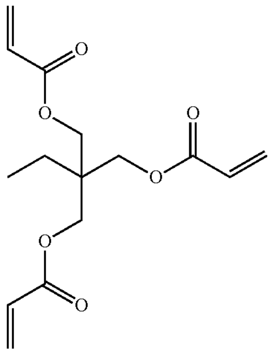

TMPTA

Evaluation in Organic EL Light-Emitting Elements

Organic EL elements were prepared using the gas barrier films obtained above. An ITO film (resistance: 30Ω) was first formed by sputtering on the above gas barrier films. The following compound layers were then sequentially vapor deposited by the vacuum vapor deposition method on the substrate (anode).

(First Hole Transmitting Layer)

Copper-phthalocyanine: film thickness 10 nm (Second Hole Transmitting Layer)

N,N'-Diphenyl-N,N'-dinaphthylbenzidine: film thickness 40 nm (Light-Emitting and Electron Transmitting Layer)

Tris(8-hydroxyquinolinato)aluminum: film thickness 60 nm (Electron Injection Layer)

Lithium fluoride: film thickness 1 nm

Metallic aluminum was vapor deposited on the compound layers to a thickness of 100 nm as a cathode, over which was applied by parallel plate CVD method a silicon nitride film 3 μm in thickness to prepare an organic EL element.

Next, a thermosetting adhesive (Epotec 310, Daizo-Nichimori) was employed to bond the gas barrier film prepared above to the organic EL element that had been fabricated, with the barrier laminate on the organic EL element side. The laminate was heated for 3 hours at 65° C. to set the adhesive. A total of 15 organic EL elements that had been sealed in this manner were prepared.

As a result, when the gas barrier films of the comparative examples were employed, the gas barrier film employed as the ITO film substrate ended up being damaged, making it impossible to obtain a good element. Conversely, when the gas barrier film of the present invention was employed, the gas barrier film employed as the ITO film substrate was not damaged and a good organic EL element was obtained.

Preparation of Solar Cells

The gas barrier films prepared above were used to prepare solar cell modules. Specifically, standard cure-type ethylene-vinyl acetate copolymer was employed as the filler for solar cell modules. Amorphous silicon solar cells were sandwiched between 10 cm square sheets of reinforced glass coated with 450 μm of ethylene-vinyl acetate copolymer and filled. The gas barrier film was then positioned thereon to prepare a solar cell module. The positioning was conducted under conditions of 150° C. while drawing a vacuum for 3 minutes, and pressure was applied for 9 minutes. The solar cell modules, prepared by this method, functioned well and exhibited good electrical output characteristics even in an environment of 85° C. and 85% relative humidity.

Preparation of a Sealing Bag

Sealing bags were prepared using the gas barrier films fabricated above. The substrate film side of the gas barrier film was fused by the heat seal method to a bag (polyethylene bag) comprised of resin film and a sealing bag was prepared. A drug in the form of Cefazolin sodium (manufactured by Otsuka Pharmaceutical Factory, Inc.) was sealed into the sealing bags obtained. The drug was stored for 6 months under conditions of 40° C. and 75% relative humidity. Evaluation of change in the color tone revealed almost no change.

(Preparation of Cured Product Employing Polymerizable Compound Denoted by General Formula (11))

A polyethylene naphthalate film (PEN film, manufactured by Teijin-DuPont, product name: Teonex Q65FA) was cut into 20 cm squares, organic layers were formed by the following procedure on the smooth surface thereof, and evaluation was conducted.

Example 9

A mixed solution of a monomer mixture having the composition indicated in Table 2 (20 g), a UV radiation polymerization initiator (manufactured by Lamberti, product name: ESACURE KTO-46) (1.5 g), and 2 butanone (190 g) was applied with a wire bar to 5 μm in liquid thickness on the PEN film. After drying, the applied layer was irradiated with UV radiation (cumulative irradiation level of about 2 J/$cm^2$) with a high-pressure mercury lamp in a chamber in which the oxygen concentration had been reduced to 0.1% by nitrogen replacement method to cure the organic layer, thereby forming an organic layer 1,000 nm±50 nm in thickness. The characteristic values of the organic film obtained (polymerization rate, smoothness (Ra), and refractive index) were measured by the following methods. The results are given in Table 2.

<Measurement of Polymerization Rate>

The polymerization rate of each of the cured films and monomer mixtures was calculated by measuring the absorption strength due to carbonyl groups in the vicinity of 1,720 $cm^{-1}$ and the absorption strength due to carbon-carbon double bonds in the vicinity of 810 $cm^{-1}$ in the infrared absorption spectrum, and substituting the values into the following equation:

$$\text{Polymerization rate}(\%)=[(a\times d-b\times c)/a\times d]\times 100$$

a: Intensity of peak in vicinity of 1720 $cm^{-1}$ in cured film b: Intensity of peak in vicinity of 810 $cm^{-1}$ in cured film c: Intensity of peak in vicinity of 1720 $cm^{-1}$ in monomer mixture d: Intensity of peak in vicinity of 810 $cm^{-1}$ in monomer mixture <Evaluation of Smoothness>

The surface smoothness was measured by atomic force microscopy (AFM). The smoothness denotes the average roughness Ra (unit nm) for measurement of a 10 μm square.

<Measurement of Refractive Index>

A small quantity of the cured film was scraped off and the refractive index was determined by the immersion method. The immersion method is a method in which particles are immersed in a liquid that can change its value of the refractive index gradually, and measuring the refractive index of the liquid where the particle boundaries are uncertain. In the present invention, the refractive index of the liquid was the value at 25° C. for a wavelength of 589 nm obtained with a multiwavelength Abbe refractometer DR-M2 (or DR-M4) manufactured by ATAGO.

Examples 10 and 11, Comparative Example 8

The polymerizable compounds in the organic layer in Example 9 were changed to equal quantities of the compounds listed below and the cured products of Examples 10 and 11, and Comparative Example 8, were fabricated. The results are given in Table 2.

TABLE 2

| | Polymerizable Compound (A) | Polymerization rate (%) | Smoothness (Ra) | Refractive index |
|---|---|---|---|---|
| Example 9 | A-1 | 93.3 | 0.4 | 1.61 |
| Example 10 | A-2 | 94.0 | 0.4 | 1.58 |
| Example 11 | A-3 | 93.1 | 0.4 | 1.58 |
| Comparative Example 8 | TMPTA | 92.0 | 0.4 | 1.51 |

In the table, TMPTA denotes trimethylolpropane triacrylate.

Based on the results of Table 2, the cured products of the polymerizable compositions of the examples were found to exhibit high polymerization rates, good smoothness, and high refractive indexes.

INDUSTRIAL APPLICABILITY

The barrier laminate of the present invention affords high barrier properties and can thus be widely employed in various elements in which barrier properties are required. Since it is possible to enhance the smoothness of the organic layer in the barrier laminate of the present invention, a smooth inorganic barrier layer can be provided. As a result, it is possible to enhance the smoothness of the outermost layer, and to improve the performance of a device formed on a gas barrier film containing the barrier laminate or the gas barrier laminate.

The entire contents of Japanese Patent Applications Nos. 2011-209077 and 2011-216640 to which this application claims priorities are incorporated herein by reference.

While the present invention has been described in detail and with reference to specific embodiments thereof, it will be apparent to one skilled in the art that various changes and modifications can be made therein without departing from the spirit and scope thereof. All the publications referred to in the present specification are expressly incorporated herein by reference in their entirety. The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined claims set forth below.

KEY TO THE NUMBERS

1 Inorganic barrier layer
2 Organic layer
3 Inorganic barrier layer
4 Alcohol
5 Substrate film
6 Organic layer
10 Barrier laminate

The invention claimed is:

1. A barrier laminate comprising at least one organic layer and at least one inorganic barrier layer, the organic layer being formed by curing a polymerizable composition comprising a polymerizable compound, wherein the polymerizable compound is a compound selected from the group consisting of the compounds denoted by general formula (1) and the compounds denoted by general formula (2):

(1)

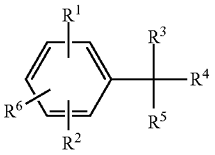

in general formula (1), each of $R^1$ and $R^2$ denotes hydrogen atom, methyl group, or cyclohexyl group; $R^3$ denotes hydrogen atom or methyl group; $R^4$ denotes hydrogen atom or methyl group; $R^5$ denotes hydrogen atom or a group selected from group A below; $R^6$ denotes a monovalent substituent comprising a polymerizable group; and the compound denoted by general formula (1) comprises at least two polymerizable groups:

(group A)

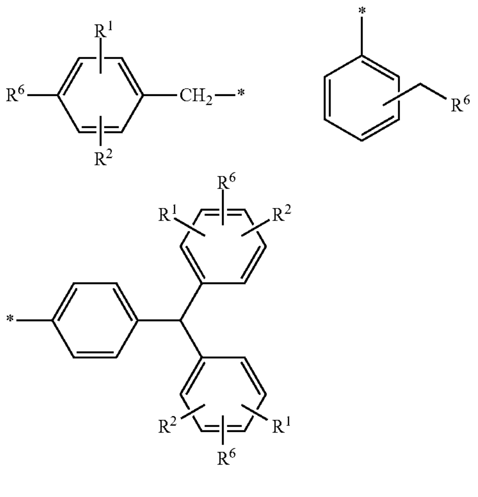

-continued

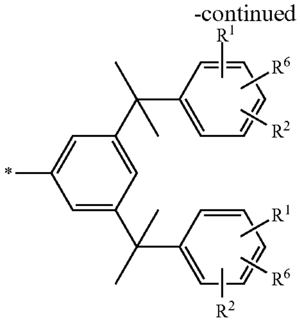

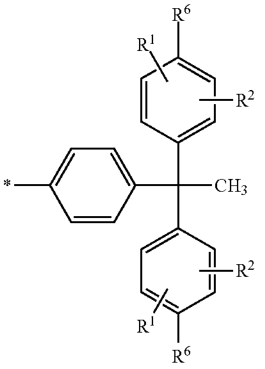

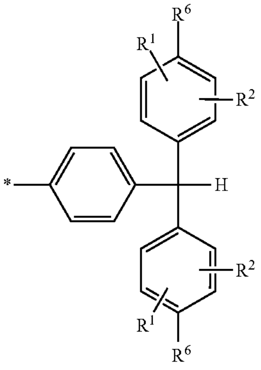

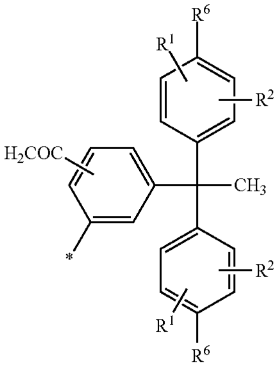

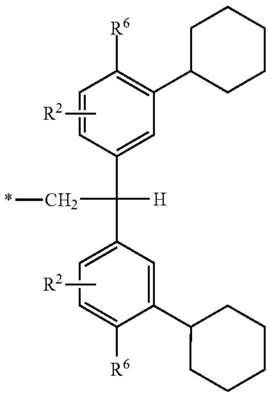

wherein each of $R^1$ and $R^2$ denotes hydrogen atom, methyl group, or cyclohexyl group;

$R^6$ denotes a monovalent substituent comprising a polymerizable group; and * denotes a binding position;

(2)

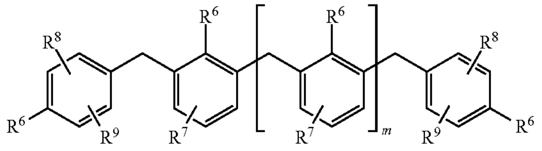

in general formula (2), $R^6$ denotes a monovalent substituent comprising a polymerizable group; each of $R^7$, $R^8$, and $R^9$ denotes hydrogen atom, methyl group, or cyclohexyl group; and m denotes 0 or 1, wherein at least 60 weight % of the total solid fraction of the polymerizable composition is the polymerizable compound selected from the group consisting of the compounds denoted by general formula (1) and the compounds denoted by general formula (2).

2. The barrier laminate according to claim 1, wherein at least 75 weight % of the total solid fraction of the polymerizable composition is the polymerizable compound selected from the group consisting of the compounds denoted by general formula (1) and the compounds denoted by general formula (2).

3. The barrier laminate according to claim 1, wherein the polymerizable compound is a polymerizable compound denoted by general formula (11):

general formula (11)

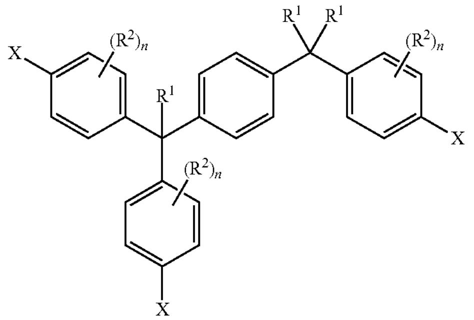

in general formula (11), $R^{21}$ denotes hydrogen atom or methyl group; $R^{22}$ denotes methyl group or cyclohexyl group; n denotes an integer of from 0 to 2; and each instance of X independently denotes a group denoted by any one of formulas (a) to (d) below:

(a)

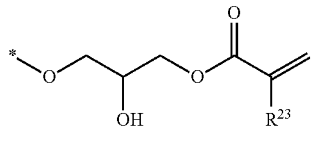

(b)

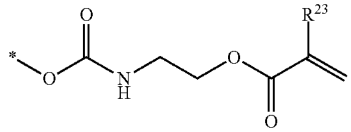

(c)

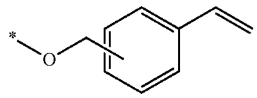

-continued (d)

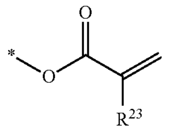

in formulas (a), (b), and (d), $R^{23}$ denotes hydrogen atom or methyl group and * denotes a binding position.

4. The barrier laminate according to claim 3, wherein $R^{21}$ denotes methyl group.

5. The barrier laminate of according to claim 3, wherein n denotes 0.

6. The barrier laminate according to claim 1, which comprises the inorganic barrier layer on the surface of the organic layer.

7. The barrier substrate according to claim 1, which has a structure formed by laminating the inorganic barrier layer, organic layer, and inorganic barrier layer in that order in mutually adjacent fashion.

8. A gas barrier film wherein the barrier laminate according to claim 1 is provided on a substrate film.

9. A device comprising the barrier laminate according to claim 1.

10. A solar cell element or an organic EL element comprising the barrier laminate according to claim 1.

11. A device optical element comprising the barrier laminate according to claim 1.

12. A bag for sealing a device, comprising the barrier laminate according to claim 1.

13. A method of manufacturing the barrier laminate according to claim 1, comprising removing impurities from a composition (A) comprising a polymerizable compound, and then curing a polymerizable composition comprising the composition (A) comprising a polymerizable compound to form an organic layer.

14. A method of manufacturing a device, comprising providing a barrier laminate by the method of manufacturing a barrier laminate according to claim 13.

15. A polymerizable compound denoted by general formula (11):

general formula (11)

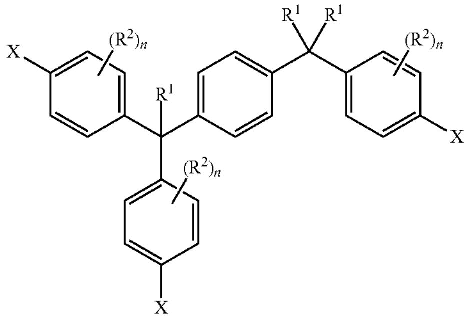

in general formula (11), $R^{21}$ denotes hydrogen atom or methyl group; $R^{22}$ denotes methyl group or cyclohexyl group; n denotes an integer of 0 to 2; and each instance of X independently denotes a group denoted by any one of formulas (b) to (d) below:

(b)

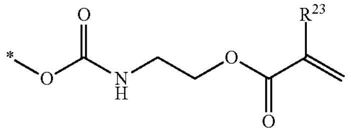

(c)

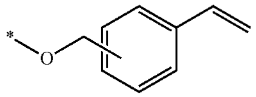

(d)

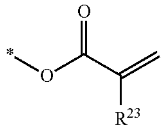

in formulas (b), and (d), $R^{23}$ denotes hydrogen atom or methyl group and * denotes a binding position.

16. The polymerizable compound according to claim 15, wherein $R^{21}$ denotes methyl group.

17. The polymerizable compound according to claim 15, wherein n denotes 0.

18. A polymerizable composition comprising the polymerizable compound according to claim 15.

19. The polymerizable composition according to claim 18, further comprising a photopolymerization initiator.

20. A polymerizable compound denoted by general formula (11):

general formula (11)

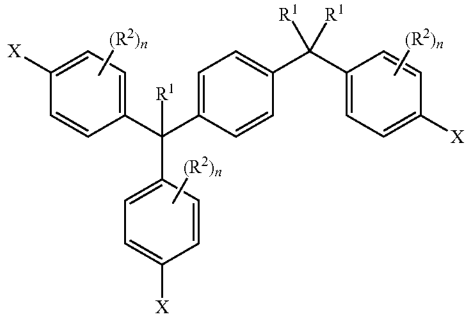

in general formula (11), $R^{21}$ denotes hydrogen atom or methyl group; $R^{22}$ denotes methyl group or cyclohexyl group; n denotes an integer of 0 to 2; and each instance of X independently denotes a group denoted by formula (b) or (d) below.

(b)

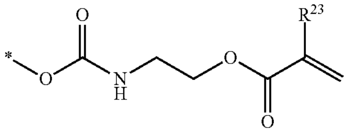

(d)

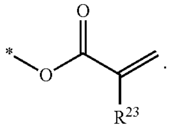

* * * * *